United States Patent [19]
Savage

[11] 3,944,097
[45] Mar. 16, 1976

[54] TREE TRANSPORTING VEHICLE
[75] Inventor: Donald D. Savage, Marietta, Ga.
[73] Assignee: B. J. Powell, Atlanta, Ga. ; a part interest
[22] Filed: Feb. 5, 1974
[21] Appl. No.: 439,737

[52] U.S. Cl. .............. 214/514; 214/6 DK; 214/82; 298/11; 296/28 C; 212/145
[51] Int. Cl.² .......................................... B60P 1/02
[58] Field of Search ....... 214/83.22, 83.24, 82, 502, 214/510, 514; 298/11

[56] References Cited
UNITED STATES PATENTS

| 940,878 | 11/1909 | Jones et al. | 214/514 |
| 3,055,514 | 9/1962 | Dale et al. | 214/514 |
| 3,235,983 | 2/1966 | Wilson | 214/510 |
| 3,831,492 | 8/1974 | Young | 214/674 |

FOREIGN PATENTS OR APPLICATIONS

| 1,209,883 | 3/1960 | France | 298/11 |

Primary Examiner—Robert J. Spar
Assistant Examiner—Lawrence J. Oresky
Attorney, Agent, or Firm—B. J. Powell

[57] ABSTRACT

A tree transporting vehicle with a base subassembly for propelling the vehicle, a catch bed assembly for receiving felled trees to transport them with an integral unloading mechanism, and a positioning linkage operatively connecting the base subassembly and catch bed assembly for selectively positioning the catch bed assembly with respect to the base subassembly. The operation of the vehicle is controlled from a side mounted cab where the operator is in a standing-sitting position.

20 Claims, 32 Drawing Figures

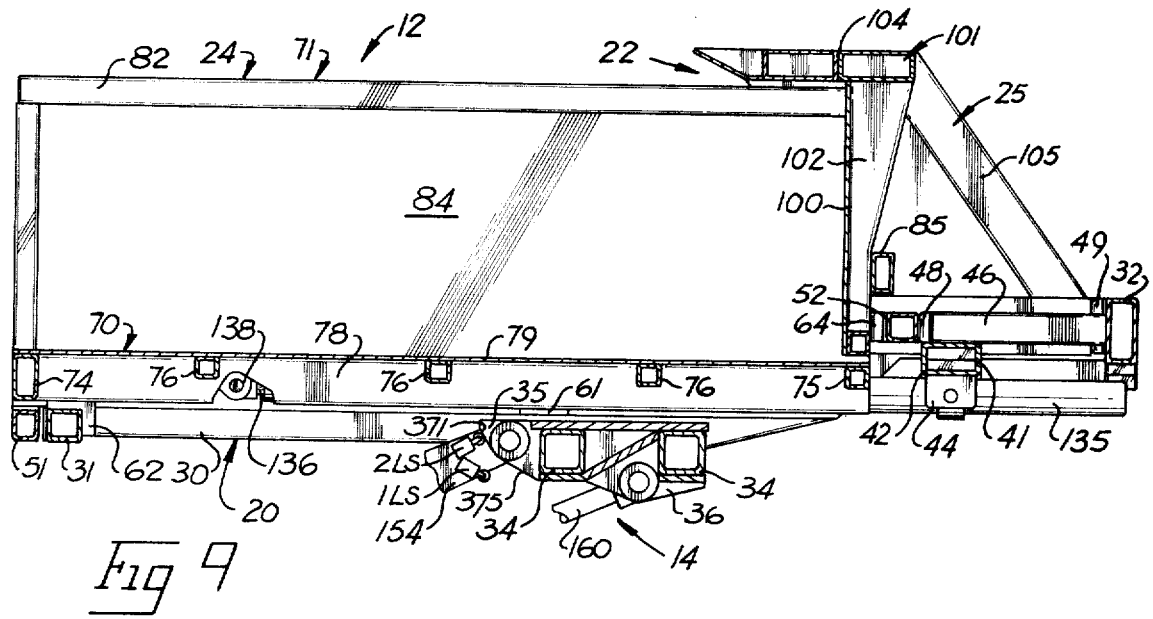
Fig 9
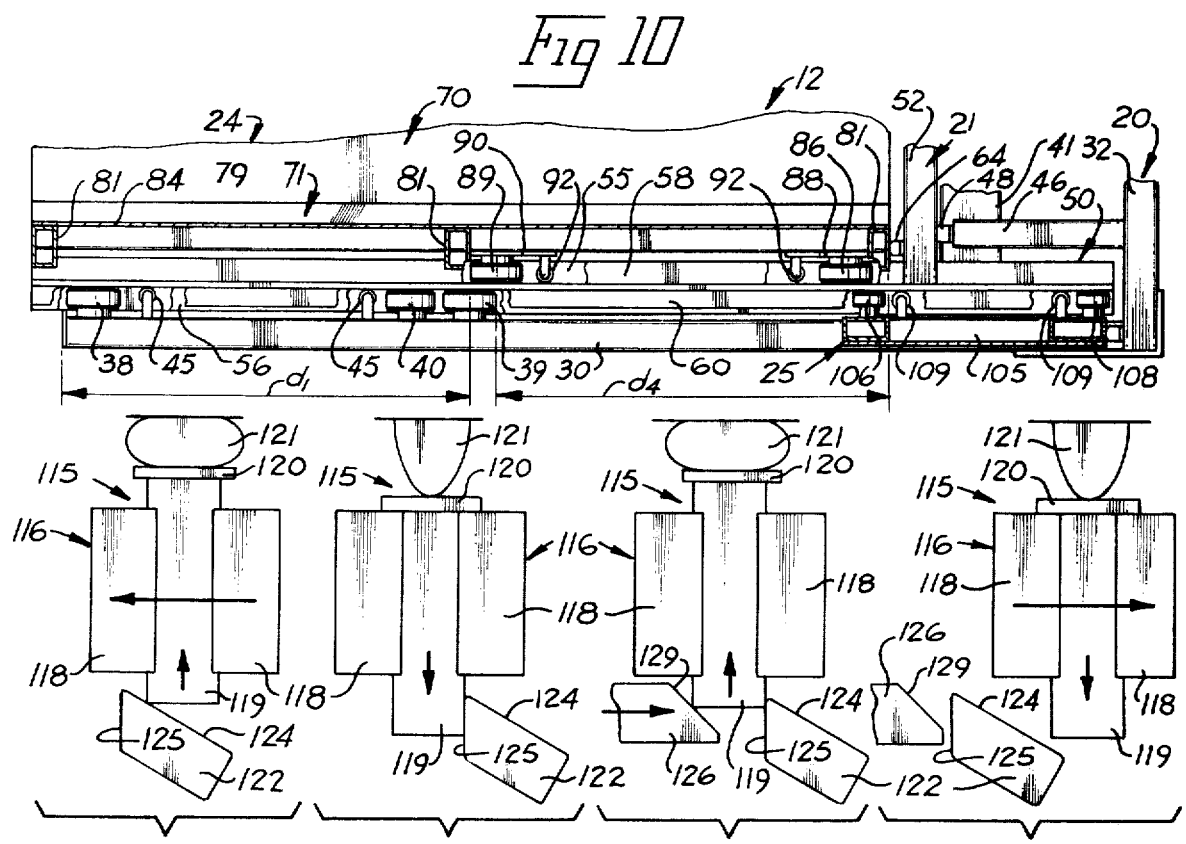
Fig 10
Fig 11  Fig 12  Fig 13  Fig 14

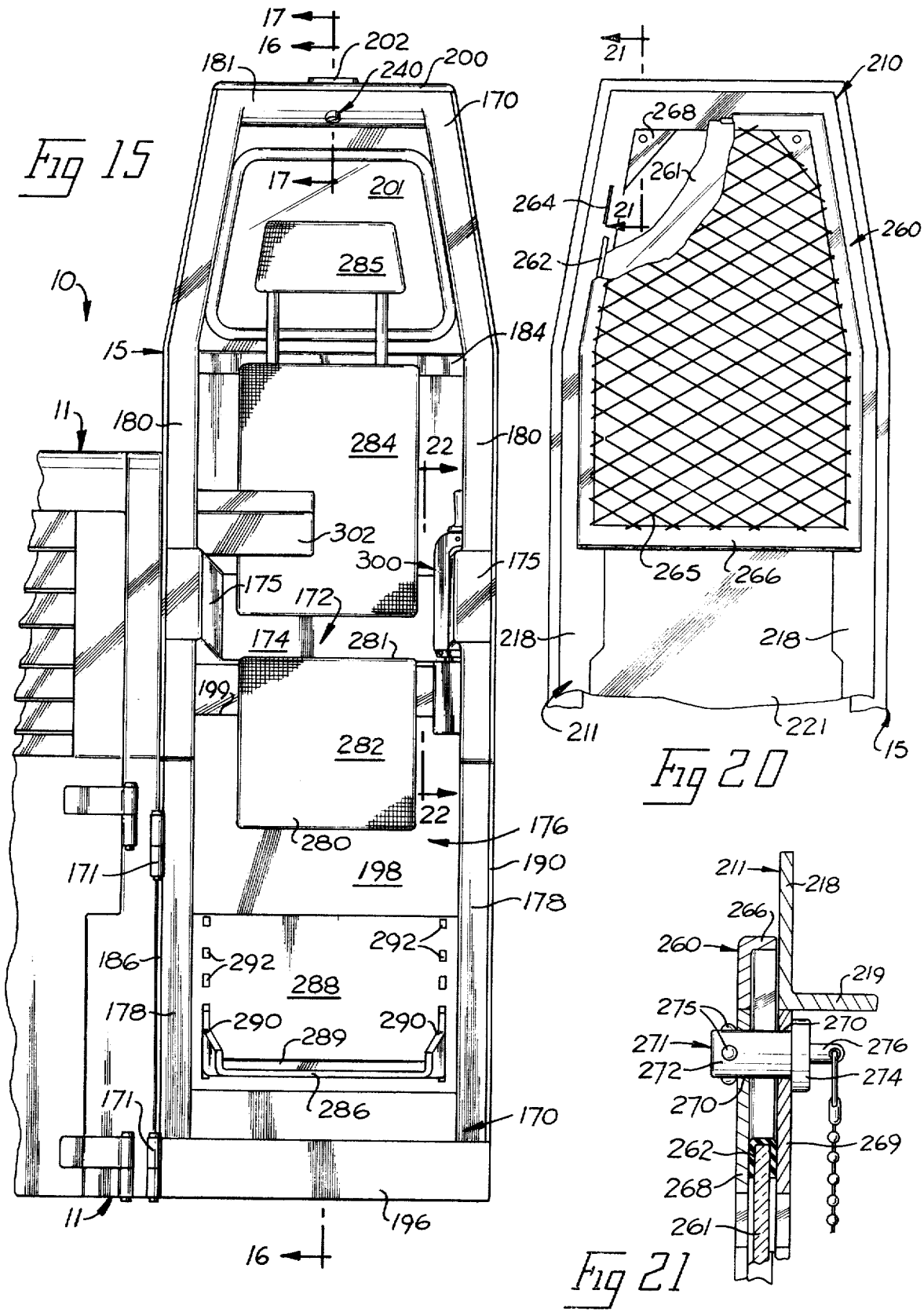

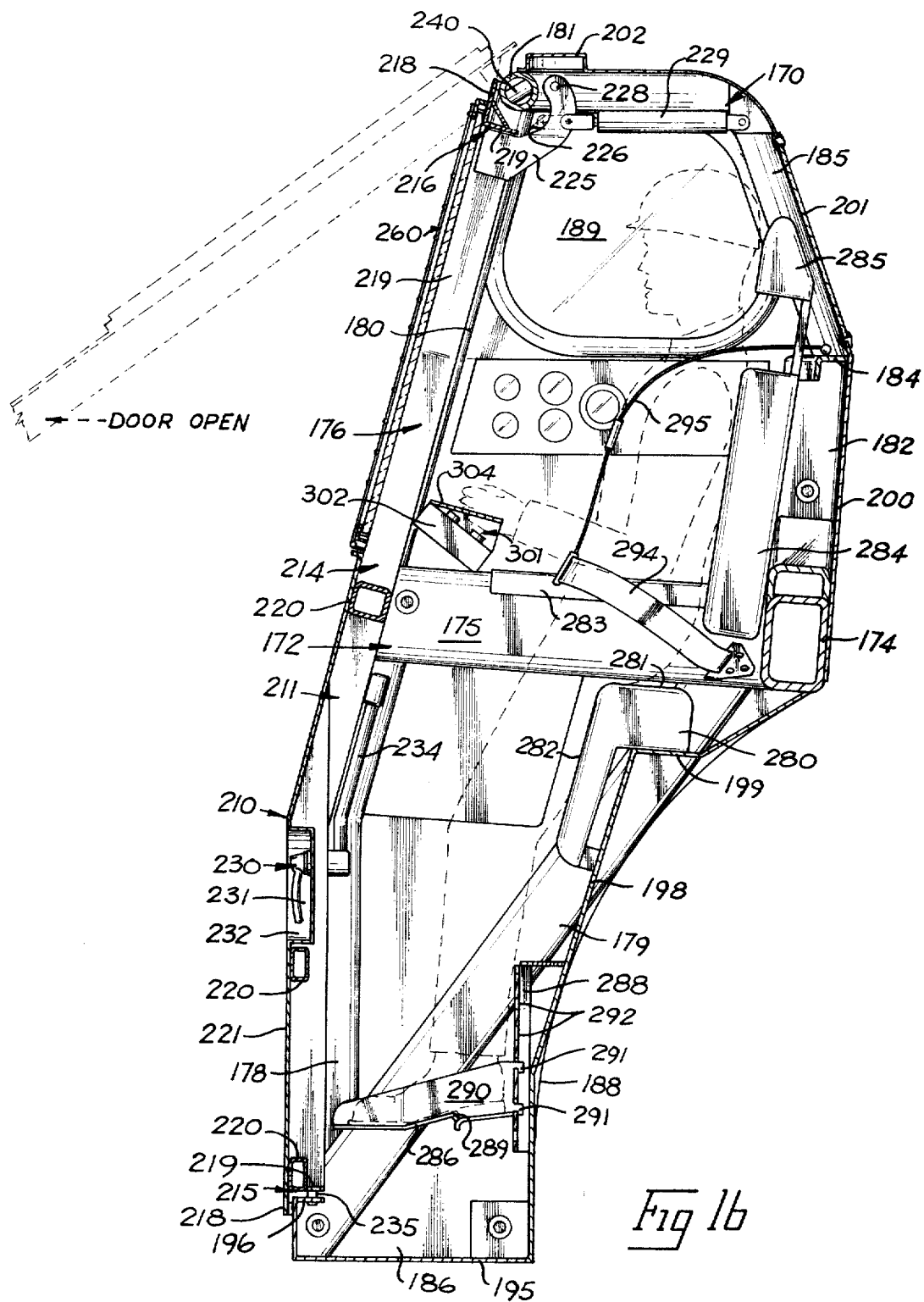

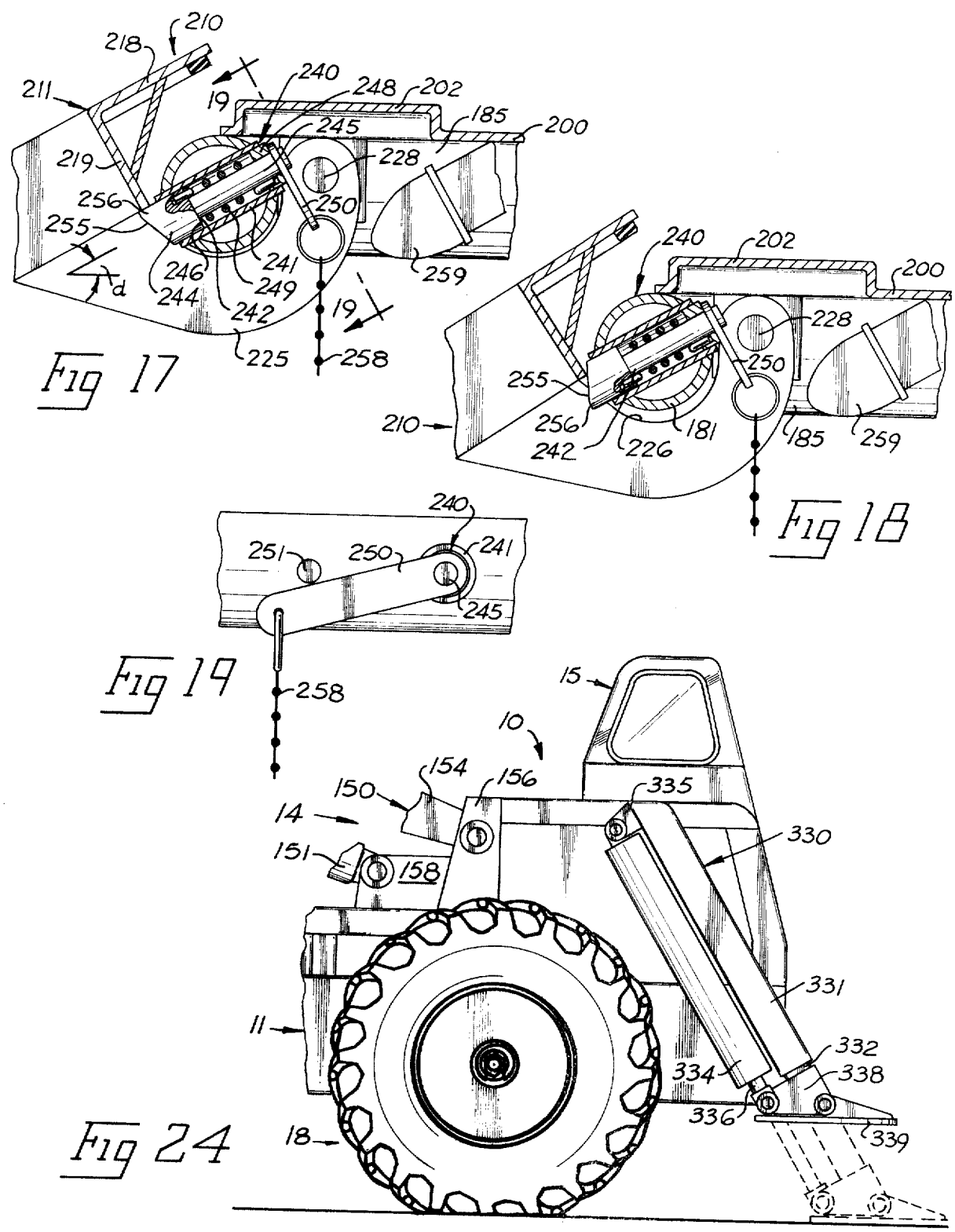

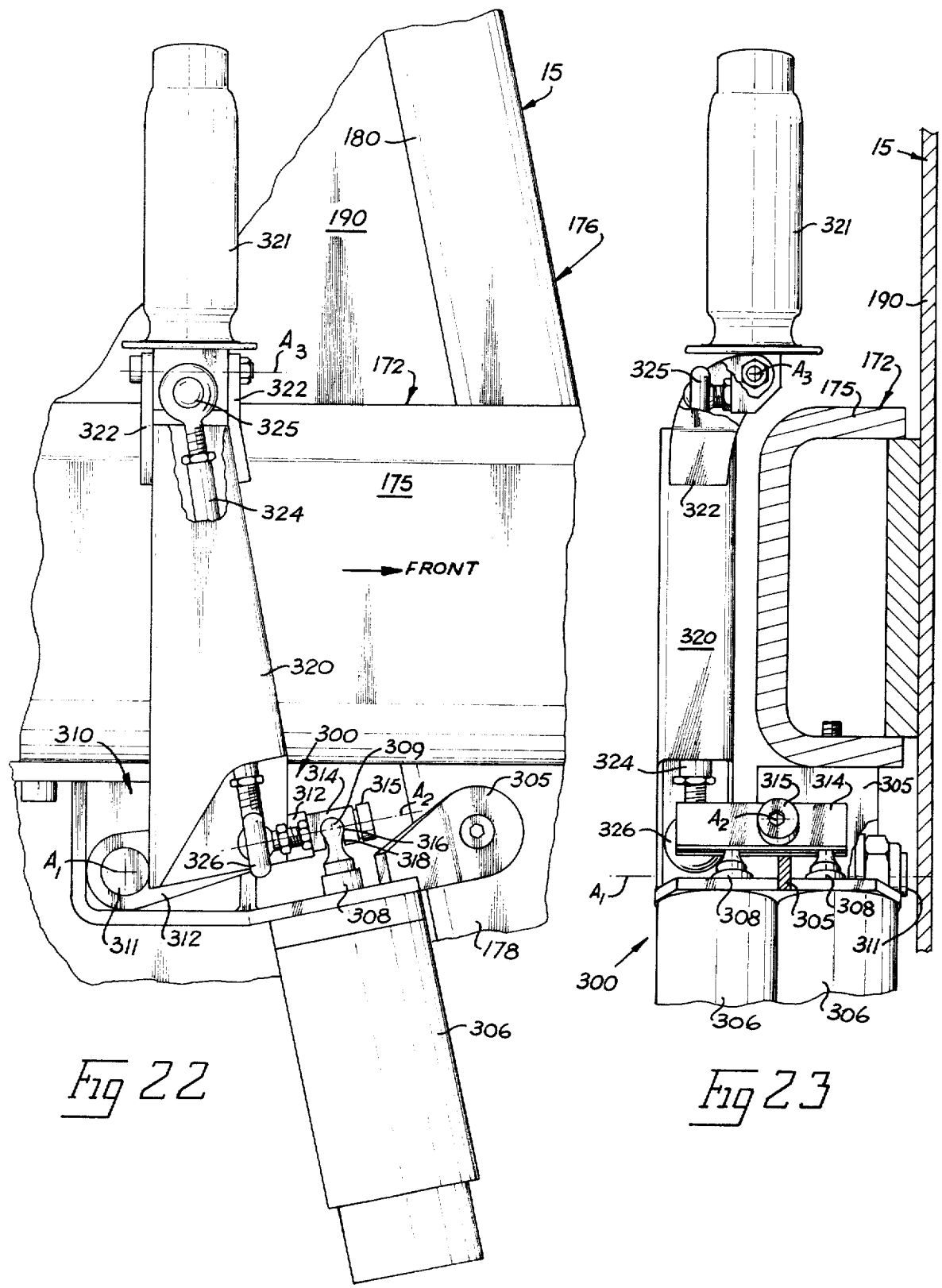

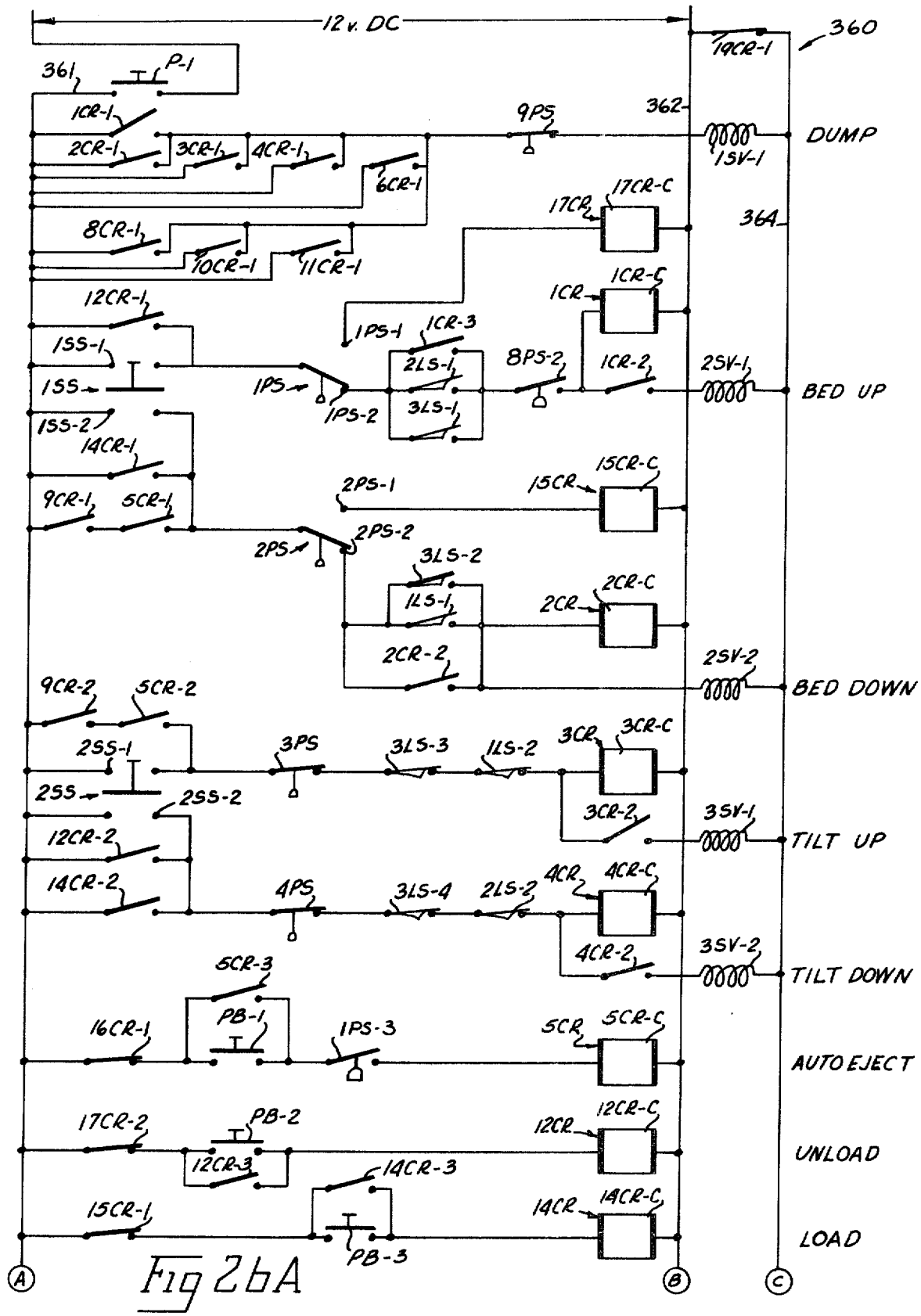

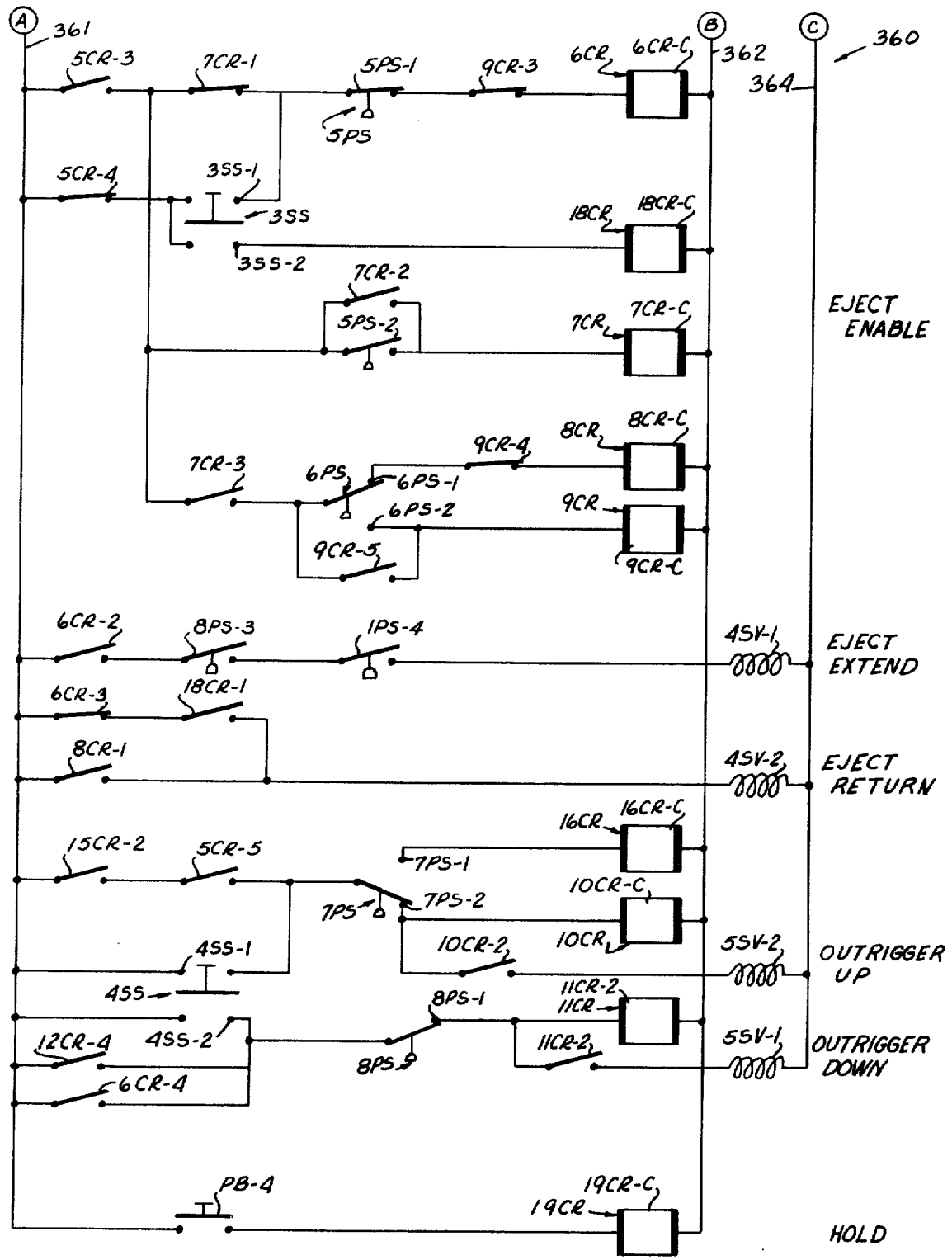

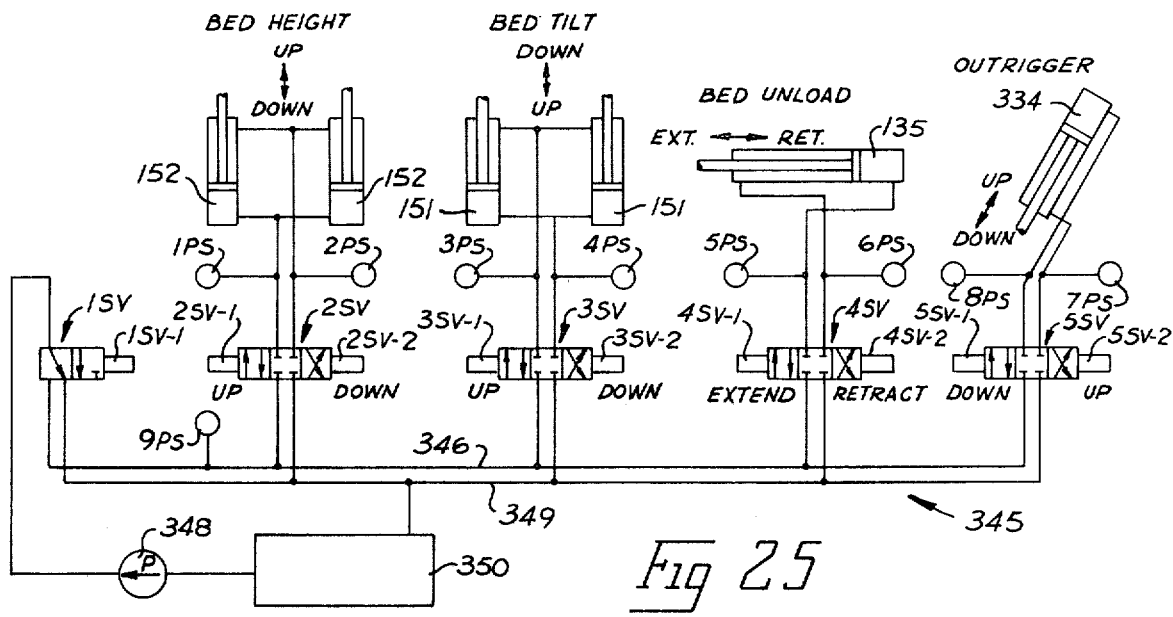
Fig 25
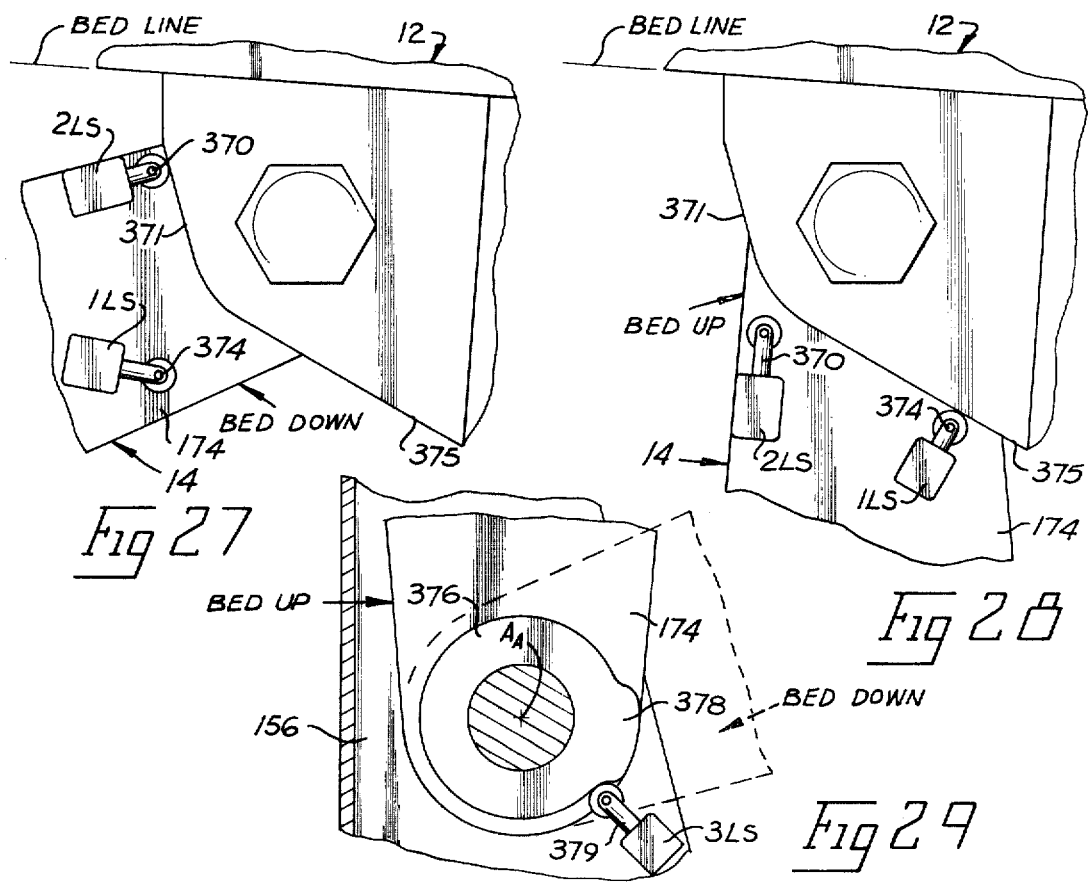
Fig 27
Fig 28
Fig 29

3,944,097

TREE TRANSPORTING VEHICLE

BACKGROUND OF THE INVENTION

As tree harvesting has become more mechanized, various vehicles have been proposed for transporting felled trees from an off-the-road location to a loading location for over-the-road vehicles. One of these vehicles that has been used is commonly called a skidder which lifts one end of a bundle of felled trees and drags the bundle therebehind. The major problem with this type of vehicle is lack of control over the trees as well as lack of maneuverability. Another of these vehicles that has been used is commonly called a forwarder which has a bed onto which a stack of trees is placed by a self-contained loading mechanism. The primary problems with this type of vehicle are lack of maneuverability of the vehicle itself and the inefficiency of the loading and unloading operations.

Another approach to felled tree transportation is to use a combination tree felling and transporting vehicle on which the trees are carried after being felled. The major problems with this type of vehicle are lack of maneuverability of the vehicle because of its size and the loss of harvesting time during transporting of the trees.

SUMMARY OF THE INVENTION

These and other problems and disadvantages associated with the prior art are overcome by the invention disclosed herein by providing a felled tree transporting vehicle which is highly maneuverable, which receives the felled trees directly from the tree harvesting machine to eliminate the normal loading process, and which has an integral unloading system to unload the trees onto an over-the-road vehicle to eliminate the normally required unloading and reloading process.

The apparatus of the invention includes a base subassembly drivingly supported on opposite sides by ground engaging wheels operated according to the skid steer principle, a catch bed assembly adapted to receive and support felled trees therein with an integral unloading mechanism, and a positioning linkage operatively connecting the base subassembly with the catch bed assembly for selectively positioning the catch bed assembly with respect to the base subassembly. The operation of the vehicle is controlled from a side mounted cab where the operator is in a standing-sitting position.

These and other features and advantages of the invention will become more apparent upon consideration of the following specification and accompanying drawings wherein like characters of reference designate corresponding parts throughout the several views and in which:

BRIEF DESCRIPTION OF THE DRAWINGS

FIG. 6A is a reduced schematic side view of the vehicle in unloading position ready to eject;

FIG. 9 is a longitudinal cross-sectional view of the catch bed assembly taken generally along line 9—9 in FIGS. 2 and 3;

FIG. 10 is a partial top view of one of the slide rails showing the construction thereof FIG. 11 is an enlarged detail of the interlock mechanism just prior to locking;

FIG. 12 is a detail similar to FIG. 11 with the interlock mechanism locked;

FIG. 13 is a detail similar to FIG. 11 showing the interlock mechanism being unlocked;

FIG. 14 is a detail similar to FIG. 11 showing the interlock mechanism after being unlocked;

FIG. 15 is an enlarged front view of the cab with the door removed;

FIG. 16 is a vertical cross-sectional view of the cab taken along line 16—16 in FIG. 15 with the door closed;

FIG. 17 is an enlarged cross-sectional view taken along line 17-17 in FIG. 15 showing the cab door catch mechanism;

FIG. 18 is a view similar to FIG. 17 showing the door catch mechanism being released FIG. 19 is a back view of the door catch mechanism taken along line 19—19 in FIG. 17;

FIG. 20 is an enlarged partial front view of the cab door;

FIG. 21 is an enlarged view taken along line 21—21 in FIG. 20 showing the escape release mechanism;

FIG. 22 is an enlarged side view taken along line 22—22 in FIG. 15 showing the single stick control unit;

FIG. 23 is a front view of the single stick control unit in FIG. 22;

FIG. 24 is a partial side view of the vehicle showing the outrigger;

FIG. 25 is a hydraulic schematic diagram for the invention;

FIG. 26A is a schematic diagram for part of the electrical control circuit of the invention;

FIG. 26B is a schematic diagram for the rest of the electrical control circuit of the invention;

FIG. 26 and 27 are enlarged detail views illustrating the operation of some of the limit switches; and, FIG. 28 is an enlarged detail view illustrating the operation of the other limit switch.

Figure 1:
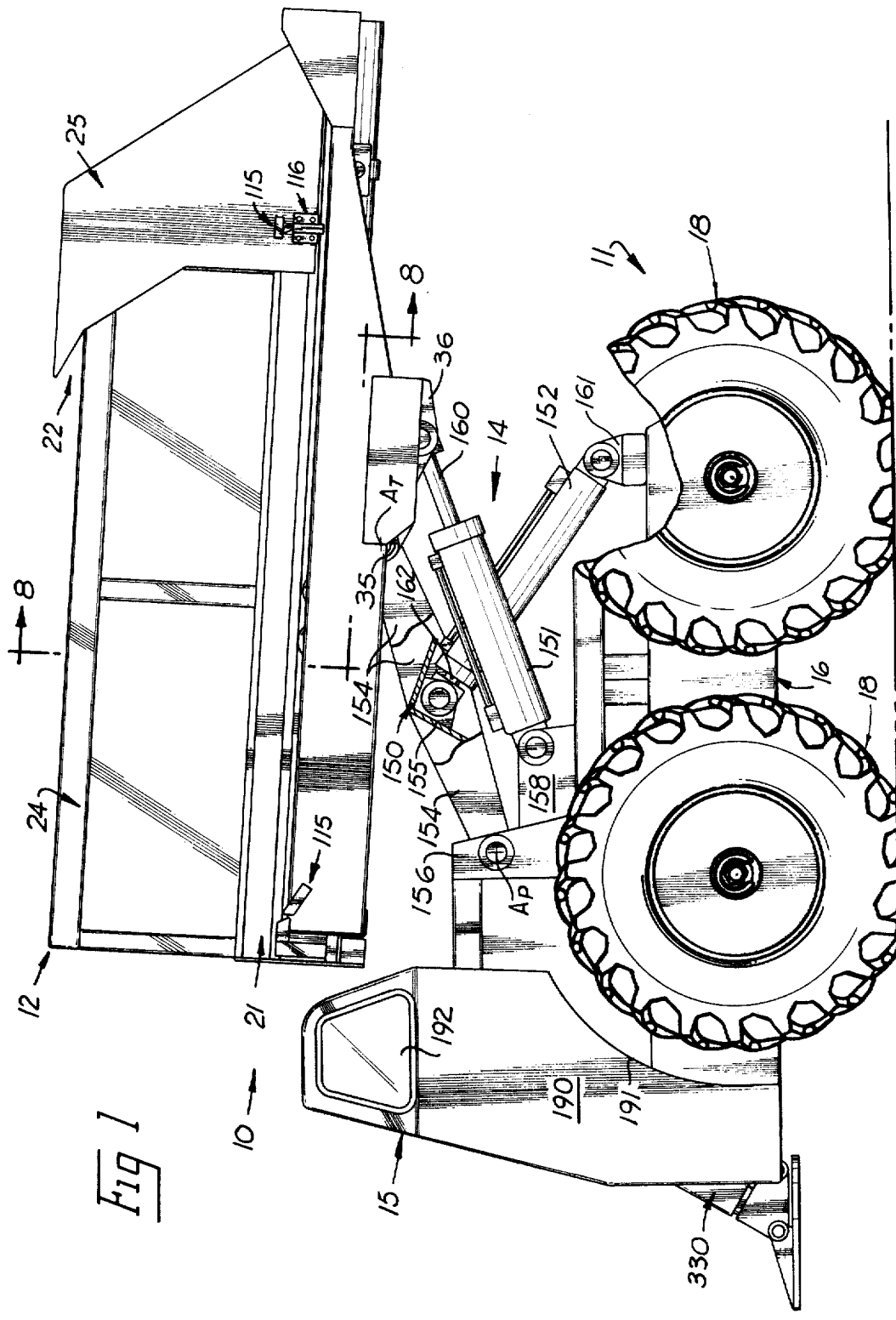
FIG. 1 is a side view of a vehicle embodying the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that the tree transporter 10 includes a base subassembly 11 onto which a catch bed assembly 12 is mounted through a positioning linkage 14. The operation of the vehicle is controlled from cab 15. The base subassembly 11 is more fully described in my copending application Ser. No. 439,736 filed on the same day as this application, and now U.S. Pat. No. 3,907,053, issued Sept. 23, 1975. Generally the base subassembly 11 includes a base frame 16 which mounts a first pair of ground engaging wheel and tire assemblies 18 on one side thereof and a second pair of wheel and tire assemblies 18 on the opposite side thereof. The base frame 16 also mounts a prime mover module (not shown) therein including an internal combustion engine drivingly connected to a pair of variable output, reversible primary hydraulic pumps having a control lever to individually vary the output of the primary pumps, and to a fixed displacement accessory hydraulic pump. A hydraulic drive motor (not shown) drives each wheel and tire assembly 18 with those motors associated with the first pair of wheel and tire assemblies 18 connected in parallel to one of the primary pumps while the other motors associated with the second pair of wheel and tire assemblies 18 are connected to the other primary pump. The output of each of the primary pumps is controlled to control the operation of the subassembly 11 according to the skid steer principle as will become more apparent.

CATCH BED ASSEMBLY

The catch bed assembly 12 is best seen in FIGS. 1–3 and 8–10 and includes generally a carriage frame 20 which movably mounts a slide rail assembly 21 thereon and a bed unit 22 movably mounted on the slide rail assembly 21. The bed unit 22 includes a bed 24 open at its forward end as seen on the left in FIG. 1 and closed at its rear end by a heel plate subassembly 25. It will be seen that the slide rail assembly 21 can be moved forwardly in the carriage frame 20 and the bed unit 22 can be moved forwardly in the slide rail assembly 21 independently of the movement between frame 20 and assembly 21. It will further be seen that the bed 24 can be moved with respect to the heel plate subassembly 25. This combination of movements allows the bed unit 22 to be extended over the over-the-road vehicle until the entire length of the trees in unit 22 are over the over-the-road vehicle. The bed 24 can then be retracted from under the trees while the heel plate subassembly 25 prevents the trees from being retracted with the bed 24 to unload the transporter vehicle 10.

CARRIAGE FRAME

Figure 8:
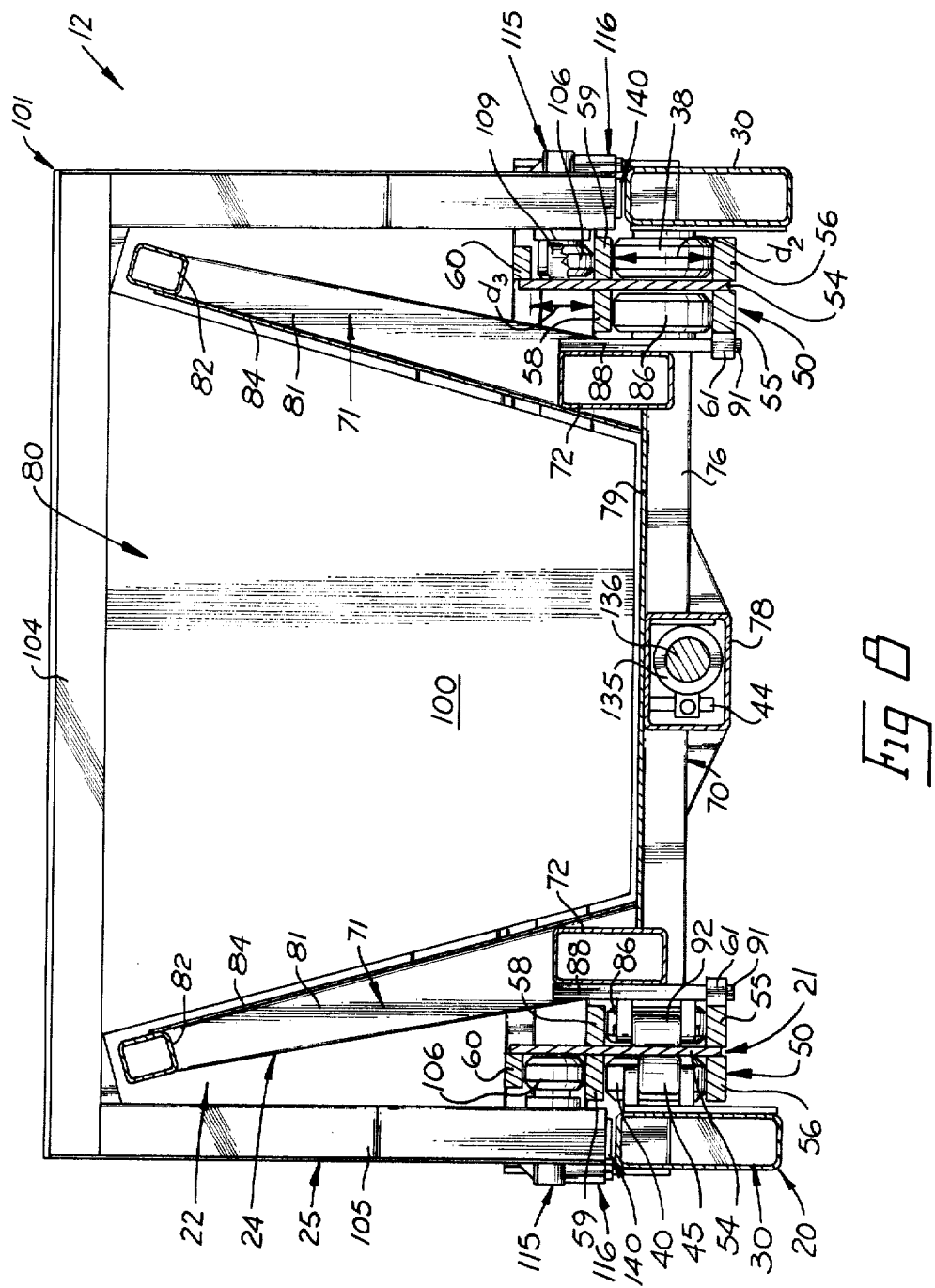
FIG. 8 is a transverse cross-sectional view of the catch bed assembly taken generally along line 8—8 in FIG. 1.

The carriage frame 20 as seen in FIGS. 8–10 includes a pair of spaced apart, parallel side beams 30 joined at their front ends by a transversely extending front rail 31 and at their rear ends by a transversely extending rear rail 32. A pair of carriage cross beams 34 extend transversely between the side beams 30 intermediate their length. The carriage beams 34 have spaced apart front pivot ears 35 and spaced apart rear pivot ears 36 thereon for connection with the positioning linkage 14 as will become more apparent.

Referring to FIGS. 8 and 10 a pair of opposed front rail support rollers 38 are mounted in the inside of the side beams 30 at their front ends for rotation about a common transversely extending axis. A pair of opposed lower rear rail support rollers 39 are mounted on the inside of the side beams 30 at a position intermediate the length of side beams 30 for rotation about a common transversely extending axis. The axis of rollers 39 is spaced rearwardly from the front ends of side beams 30 a distance $d_1$ as will become more apparent. A pair of opposed upper rear rail support rollers 40 are mounted on the inside of side beams 30 just forwardly of lower rail support rollers 39 for rotation about a common transversely extending axis. The rotational axes of the front rollers 38 and lower rear rollers 39 lie in a common plane generally parallel to the longitudinal centerline of the side beams 30 while the rotational axis of the upper rear rollers 40 is spaced slightly above this plane as will become more apparent.

Side thrust rollers 45 are mounted on the inside of side beams 30 between rollers 38–40 and extend inwardly therefrom. The side thrust rollers 45 are rotatable about axes generally normal to both the longitudinal centerline of side beams 30 and the axes of rollers 38–40 as will become more apparent.

A transversely extending cylinder support beam 41 extends between the side beams 30 forwardly of the rear rail 32. The beam 41 has an offset 42 therein which mounts a pair of transversely centered cylinder pivot blocks 44 on the bottom thereof as best seen in FIG. 9. The use of beam 41 will become more apparent.

A pair of spaced apart tubular abuttments 46 as seen in FIG. 9 extend forwardly from the rear rail 32 of carriage frame 20 to the cylinder support beam 41 intermediate the ends of rail 32. A rubber bumper 48 is provided on the forward end of each of the abuttments 46 to engage the slide rail assembly 21 in its retracted position as will become more apparent. A pair of rubber bumpers 49 also shown in FIG. 9 are mounted on the front of the rear rail 32 adjacent its opposite ends and outboard of abuttments 46 to engage the heel plate subassembly 25 in its retracted position as will become more apparent.

SLIDE RAIL ASSEMBLY

Figure 6:
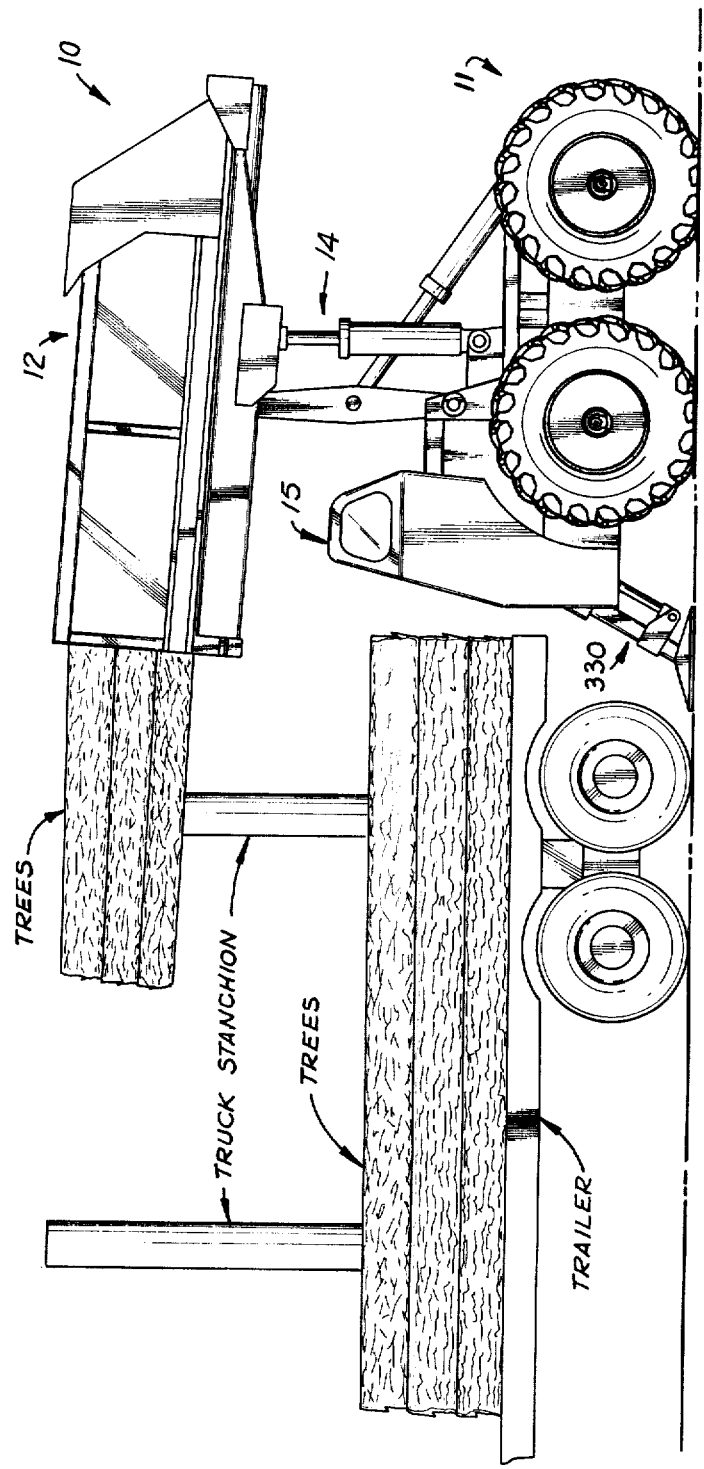
FIG. 6 is a reduced schematic side view of the vehicle during the ejecting operation.
Figure 7:
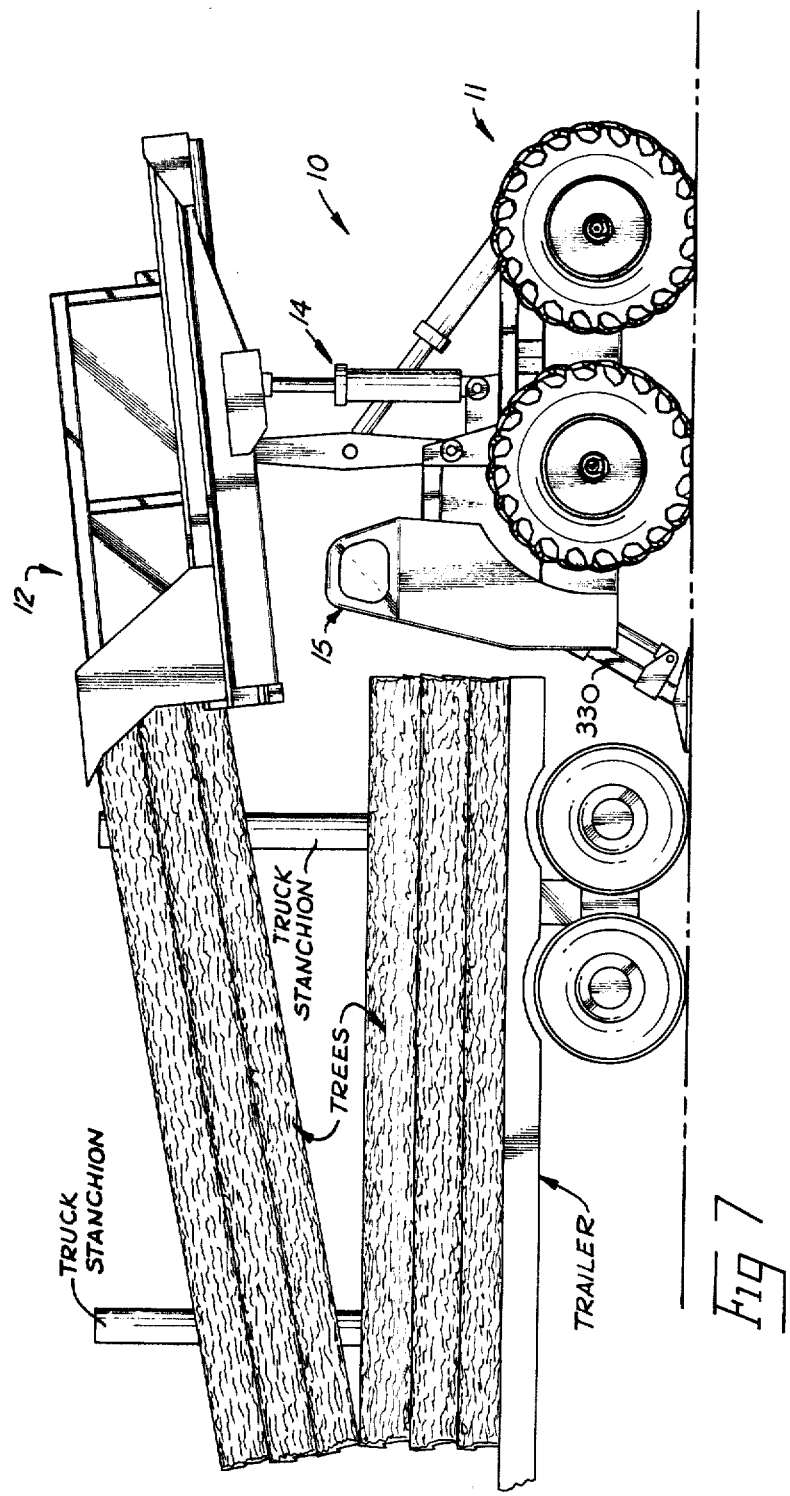
FIG. 7 is a reduced schematic side view of the vehicle during the ejecting operation.

The slide rail assembly 21 is supported on rail support rollers 38–40 between side beams 30 so that it can be moved from its retracted position shown in FIGS. 1, 9 and 10 to an extended position forwardly in beams 30 as seen in FIGS. 6 and 7 when the trees in the catch bed assembly 12 are being unloaded. The slide rail assembly 21 includes a pair of spaced apart parallel slide rails 50 joined at their front ends by a front transversely extending cross beam 51 extending under rails 50 and forwardly of their rear ends by a transversely extending tie beam 52.

Each slide rail 50 has an upstanding central web 54 extending along its length with opposed lower inner and outer race flanges 55 and 56 extending along the bottom edge of central web 54, intermediate inner and outer race flanges 58 and 59 extending along the length of the web 54 intermediate its height parallel to flanges 55 and 56 and spaced above flanges 55 and 56 a distance $d_2$, and an outer upper race flange 60 extending along the length of the top of web 54 parallel to the outer intermediate flange 59 and spaced thereabove a distance $d_3$. The lateral spacing between slide rails 50 and the distance $d_2$ between the outer race flanges 56 and 59 are such that the flanges 56 and 59 will engage rail support rollers 38–40 to movably support the slide rail assembly 21 thereon. Thus, it will be seen that the slide rail assembly 21 can be rolled forwardly on the rail support rollers 38–40 from its retracted position shown in FIG. 9 to its extended position shown in FIG. 6 when stops 61 on the inside edges of the inner lower race flanges 55 as seen in FIG. 9 engage abuttments 62 carried by the front rail 31 on the carriage frame 20. Side movement of the slide rail assembly 21 is prevented by the side thrust rollers 45 rolling along the outside of the central webs 54 between the outer race flanges 56 and 59. The rear lower portion of each slide rail 50 has a recess 64 to allow the slide rail assembly 21 to pass over the cylinder support beam 41 when the assembly 21 is retracted as seen in FIG. 9 and the bumpers 48 engage the back of the tie beam 52.

BED

The bed 24 is movably carried by the inner race flanges 55 and 58 and includes a bottom subassembly 70 with upstanding side subassemblies 71 along opposite sides of the bottom subassembly 70. The bottom subassembly 70 as seen in FIGS. 8–10 includes a pair of side beams 72 held in spaced apart parallel positions by a forward cross beam 74 joining their front ends, a rear cross beam 75 at their rear ends, and a plurality of spaced apart intermediate cross beams 76 intermediate their ends. A central drive tube 78 extends rearwardly from the forward cross beam 74 through the intermediate and rear cross beams 76 and 75 to the rear end of bed 24, and is centered between side beams 72 and parallel thereto. A bottom plate 79 extends across the tops of cross beams 74–76 and between the side beams 72 to form the bottom of the tree receiving chamber 80 as will become more apparent.

Each side subassembly 71 includes a plurality of spaced apart side pillars 81 which extend upwardly and outwardly from the side beams 72 of the bottom subassembly 70 and joined together at their upper ends by an edge rail 82 generally parallel to and spaced above the side beams 72. A side plate 84 extends from edge rail 82 to the bottom plate 79 of the bottom subassembly 70 to form the side of chamber 80. A tie beam 85 connects the rear side pillars of the side subassemblies 71 to reinforce same while serving to drive the heel plate subassembly 25 forward with the bed 24 as will become more apparent. Thus, chamber 80 has a transverse trapezoidial shape with an open tree receiving front end and top with its rear end closed by the heel plate subassembly as will become more apparent.

As best seen in FIGS. 8–10, a pair of opposed rear bed support rollers 86 are rotatably mounted on brackets 88 depending from the outside rear ends of side beams 72 of bed 24 for rotation about a common transversely extending axis generally parallel to the bottom plate 79. A pair of opposed front bed support rollers 89 are rotatably mounted on brackets 90 depending from the outside of side beams 72 intermediate their ends for rotation about a common transversely extending axis generally parallel to the bottom plate 79. The front rollers 89 are spaced forwardly from the rear end of bed 24 a distance $d_4$ as will become more apparent and the axes of the rear bed rollers 86 and the front bed rollers 89 lie in a common plane generally parallel to the bottom plate 79. The bed 24 is sized so that the rollers 86 and 89 will be supported between the inner race flanges 55 and 58 to movably support bed 24 between the slide rails 50.

The rear roller brackets 88 are provided with depending extensions 91 which engage the rear ends of stops 61 on the inside edges of the lower inner race flanges 55 of slide rail assembly 21 to limit the forward extension of bed 24 with respect to the slide rail assembly 21. The front roller brackets 90, of course, clear the stops 61.

To prevent lateral movement of the bed 24 with respect to slide rails 50, side thrust rollers 92 are mounted on brackets 88 and 90 between rollers 86 and 89 and extend inwardly therefrom. The rollers 92 are rotatable about axes normal both to the axes of rollers 86 and 89 and the longitudinal centerline of the bed 24 and roll along the inside edges of the central webs 54 of slide rails 50 between the inner race flanges 55 and 58 as seen in FIGS. 8 and 10.

HEEL PLATE SUBASSEMBLY

The heel plate subassembly 25 is movably carried by the outer race flanges 59 and 60 for movement from its retracted position shown in FIGS. 1–5 and 8–10 with the bed 24 to its extended position shown in FIGS. 6 and 7, and from its extended position back to its retracted position independently of the retraction of bed 24. This allows the bed 24 to be retracted from under the trees supported therein while the heel plate subassembly remains in its extended position to unload the trees.

The heel plate subassembly 25 includes a depending heel plate 100 extending down into the tree receiving chamber 80 forwardly of the tie beam 85 of bed 24 and an inverted U-shaped frame 101 which supports the heel plate 100. The heel plate 100 is generally perpendicular to the longitudinal centerline of bed 24 with the general shape as the cross-sectional shape of the tree receiving chamber 80 so that a small clearance is provided between the bottom and side plates 79 and 84 and the heel plate 100. Reinforcing struts 102 are provided on the back of the heel plate 100 which are engaged by the tie beam 85 on bed 24 to drive the heel plate subassembly 25 forwardly with bed 24.

The top central member 104 of the frame 101 extends across bed 24 above the edge rails 82 and mounts the heel plate 100 as well as the reinforcing struts 102. The member 104 extends forwardly of heel plate 100 over the bed 24 to act as a retainer to prevent those ends of the trees against the heel plate 100 from tipping upwardly. The front edge of the member 104 is chamfered inwardly and rearwardly to act as a deflector to guide the trees into chamber 80 as they are being loaded. Upstanding side members 105 depend from opposite ends of the central member 104 outboard of the bed 24 and slide rail assembly 21 to support central member 104 and thus heel plate 100. The side members 105 are generally vertically aligned with the side beams 30 of the carriage frame 20 and terminate just above the top edge of the side beams 30.

Opposed front heel support rollers 106 are mounted on the front lower inside of the side members 105 for rotation about a common transversely extending axis while opposed rear heel support rollers 108 are mounted on the rear lower inside of the side members 105 for rotation about a common transversely extending axis. The frame 101 is sized so that the rollers 106 and 108 are supported between the outer race flanges 59 and 60 as seen in FIGS. 8 and 10 so that the heel plate subassembly 25 can move along the length of slide rails 50. Inwardly extending side thrust rollers 109 are mounted on the inside of side members 105 between the front and rear heel support rollers 106 and 108 that roll along the outside of central web 54 between race flanges 59 and 60 to maintain the lateral position of the heel plate subassembly 25.

A pair of interlock mechanisms 115 on opposite sides of the catch bed assembly 12 operatively connect the heel plate assembly 25 with the slide rail assembly 21 and carriage frame 20 so that when the bed 24 moves the heel plate assembly 25 to its extended position shown in FIG. 6, the interlock mechanisms 115 hold the heel plate assembly 25 in its extended position until the bed 24 has been fully retracted. When the bed 24 is fully retracted, the interlock mechanisms 115 release the heel plate assembly 25 to allow it to roll back to its retracted position seen in FIG. 1 under the force of gravity.

As best seen in FIGS. 1 and 11–13, each interlock mechanism 115 includes a latch assembly 116 positioned on the lower outside forward portion of the side member 105 of the heel plate assembly 25. The latch assembly 116 includes a pair of spaced apart guides 118 which slidably mount a latch 119 therebetween for movement toward and away from the top of side beams 30 in carriage frame 20. The downward movement of latch 119 is limited by a lip 120 on the top thereof which engages the tops of guides 118 when the latch 119 is extended to project below guides 118 and side member 105. A rubber bumper 121 on side member 105 above latch 119 constantly urges the latch 119 toward its extended position below guides 118 as best seen in FIGS. 1 and 14.

Each interlock mechanism 115 further includes a keeper 122 on the outside upper front portion of the side beam 30 to engage the latch 119 and hold the heel plate subassembly 25 in its extended position as the bed 24 is retracted. The keeper 122 has a rearwardly facing camming surface 124 that angles upwardly toward the front of the side beam 30 to engage the lower leading corner of latch 119 and cam it upwardly against bumper 121 as the heel plate subassembly 25 approaches its extended position as seen in FIG. 11 during its foward movement with bed 24. The keeper 122 also has a forwardly facing locking face 125 in front of which the latch 119 drops as it moves forwardly over the upper end of the camming surface 124 upon the heel plate subassembly reaching its extended position as seen in FIGS. 6 and 12. The bumper 121 forces the latch 119 down in front of locking face 125 so that face 125 engages the rear side of latch 119 to hold the heel plate subassembly 25 in its extended position when the bed 24 is retracted.

Each interlock mechanism 115 further includes a release cam 126 mounted on the front outside edge of the slide rail 50 by an offset bracket 128 that spaces the release cam 126 outboard of the side member 105 of heel plate subassembly 25 and the side beam 30 in longitudinal alignment with the keeper 122 and latch assembly 116. The rear end of the release cam 126 defines a release camming surface 129 that angles downwardly toward its rear end. As the bed 24 is retracted, the rear side pillars 81 on bed 24 eventually engage bumpers 64 on opposite ends of the front of the tie beam 52 of slide rail assembly 21 to move the slide rail assembly 21 therewith toward its retracted position. As the bed 24 and slide rail assembly 21 approach their retracted positions, the release cam 126 is moved rearwardly until the camming surface 129 engages the front lower edge of the latch 119 and forces the latch 119 upwardly as seen in FIG. 13. When the bed 24 reaches its retracted position shown in FIG. 7, the camming surface 129 has lifted the latch 119 high enough to clear the locking face 125 on keeper 122 to release the heel plate subassembly 21. When the front end of the catch bed assembly 12 is tilted up as will become more apparent, the force of gravity will cause the heel plate subassembly 25 to roll back along the slide rails 50 as seen in FIG. 14 to its retracted position.

An extension hydraulic cylinder 135 as seen in FIG. 9 is pivoted intermediate its ends between the pivot blocks 44 depending from the cylinder support beam 41. The forwardly extending portion of cylinder 135 extends up the central drive tube 78 on the bed 24 and its forwardly projecting piston rod 136 is pinned to the pivot ears 138 within tube 78 adjacent the forward end of bed 24. It will be noted that cylinder 135 clears the inside of tube 78 so that the bed 24 is extended as the piston rod 136 is extended and retracted as the piston rod is retracted.

Figure 8A:
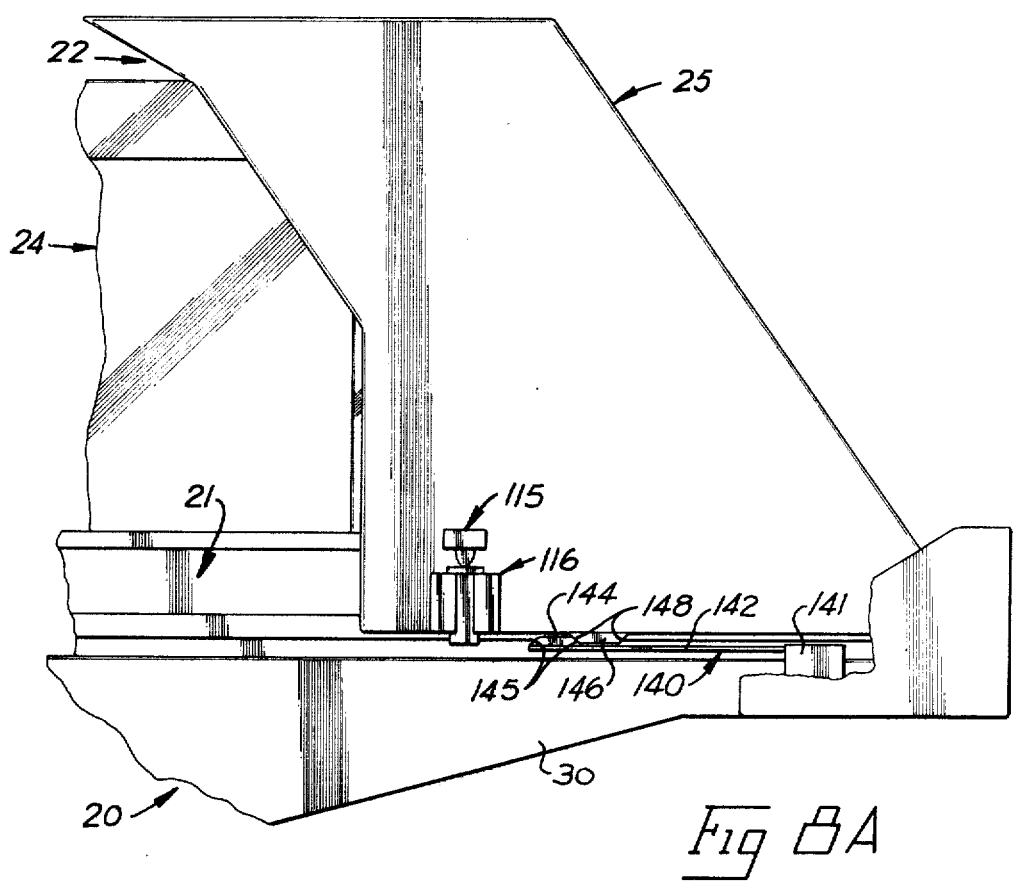
FIG. 8A is an enlarged partial side view of the heel plate assembly illustrating the detent mechanism.

A pair of detent mechanisms 140 are provided as best seen in FIGS. 8 and 8A for retaining the heel plate subassembly 25 in its retracted position once retracted until it is forced forwardly by cylinder 135. Since the detent assemblies 140 are identical in construction, only one will be described in detail.

Referring particularly to FIG. 8A, mechanism 140 includes a bracket 141 mounted on the top of side beam 30 forwardly of rear rail 32 as will become more apparent. A resilient leaf spring strip 142 extends forwardly of and is carried by bracket 141 over the side beam 30. The forward end of strip 142 mounts a catch 144 on the top thereof with inclined front and rear faces 145. A detent 146 is mounted under the bottom of side member 105 of heel plate assembly 25 overlying rail 30. The detent 146 also has front and rear faces 148. The detent 146 and strip 142 are located so that when the heel plate subassembly 25 is in its fully retracted position, the front face 148 of detent 146 bears against the rear face 145 of catch 144. The resiliency of the strip 142 is such that catch 144 is urged toward the bottom of side member 105 to prevent shifting motion of heel plate subassembly 25 as the machine moves. When cylinder 135 is extended, the detent 146 rides over catch 144 by deflecting it down toward beam 30. When the heel plate subassembly 25 retracts, the detent 146 again depresses catch 144 and passes thereover so that the heel plate subassembly 25 is again retained by catch 144.

POSITIONING LINKAGE

Figure 3:
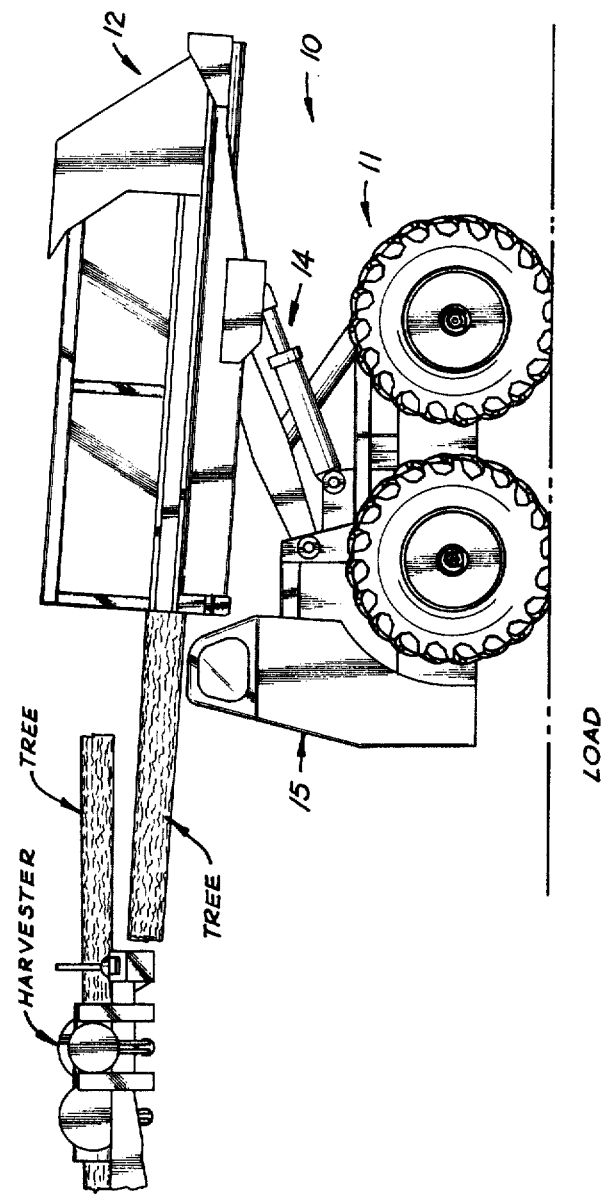
FIG. 3 is a rear end view of the vehicle.

The positioning linkage 14 as seen in FIGS. 1 and 3 includes a positioning arm subassembly 150, a pair of parallel tilt hydraulic cylinders 141 and a pair of parallel positioning hydraulic cylinders 152. The positioning arm subassembly 150 includes a pair of spaced apart lift arms 154 maintained parallel by a cross brace 155. The upper ends of arms 154 are pinned to the front pivot ears 35 on the carriage beams 34 of the catch bed assembly 12 and the lower ends of arms 154 are pinned to a pair of stanchions 156 on opposite sides of the base frame 16 of the subassembly 11. The tilt hydraulic cylinders 151 are pinned at their lower ends to a pair of pivot brackets 158 on opposite sides of the base frame 16 centrally located on frame 16 along its length below and behind stanchions 156. The upwardly projecting piston rods 160 of cylinders 151 are pinned to the rear pivot ears 36 on the carriage beams 34 of catch bed assembly 12 so that, as the piston rods 160 are extended and retracted, the front end of the catch bed assembly 12 will be tilted down or up about the horizontal tilt axis $A_T$ passing through the centers of the front pivot ears 35 to which arms 154 are pinned. The tilt axis $A_T$ is normal to the longitudinal centerline of the vehicle. The center-to-center distance between the pinned joints in stanchions 156 and in brackets 158 is equal to the center-to-center distance between the pinned joints in front pivot ears 35 and rear pivot ears 36 so that the arms 154 and tilt cylinders 151 define an extendible leg four bar linkage with cylinders 151 acting as the extendible leg.

The positioning cylinders 152 are pinned to the rear end of the base frame 16 at their lower ends in pivot brackets 161 and the upper projecting piston rods 162 of cylinders 152 are pinned to pivot ears 164 on the bottom of the cross brace 155 between lift arms 154. As piston rods 162 are extended and retracted, it will be seen that the catch bed assembly 12 will be raised and lowered as the positioning arm subassembly 150 pivots about the horizontal positioning axis $A_p$ passing through the pinned joints in stanchions 156 normal to the longitudinal centerline of the vehicle 10. Thus, the positioning cylinders 152 control the height of the catch bed assembly 12 while the tilt cylinders 151 control the attitude of assembly 12 as will become more apparent.

CAB

The cab 15 is positioned on the near side of the front end of the base frame 16 as seen in FIG. 1. The operator controls the vehicle 10 from a standing-sitting position in the cab 15. The cab 15 includes a framework 170 which is pivoted to the base frame 16 on hinges 171 as best seen in FIG. 15 so that the cab 15 can be pivoted away from the base subassembly 11 for access to the prime mover module.

The framework 170 includes a forwardly opening U-shaped yoke 172 which serves as the primary support for the cab and protection for the driver as seen in FIGS. 15 and 16. The yoke 172 is generally horizontally oriented with its base 174 behind the driver and its forwardly extending legs 175 extending along opposite sides of the driver to terminate at the front driver access opening 176 in frame work 170. Spaced apart, generally parallel lower front support pillars 178 depend from the front ends of legs 175 of yoke 172 and terminate generally in the plane of the bottom of the base frame 16. A pair of reinforcing struts 179 depend from the rear ends of legs 175 of yoke 172 and angle forwardly and downwardly therefrom to join with the lower ends of front support pillars 178.

Spaced apart, generally parallel upper front support pillars 180 extend upwardly and rearwardly from the front ends of legs 175 and are joined at their upper ends by a cross tube 181. The pillars 180 also angle laterally inwardly toward each other above the shoulder line of the driver as seen in FIG. 15 as will become more apparent. A pair of upstanding rear side braces 182 as seen in FIG. 16 extend upwardly from the rear corners of the juncture of legs 175 with base 174 with their upper ends joined by a rear cross brace 184 at about the shoulder line of the operator as will become more apparent. A pair of side tubes 185 extend from opposite ends of the cross brace 184 first upwardly and forwardly and then horizontally to join with the top back corners of the upper front support pillars 180.

An inboard side plate 186 extends over the inboard outside of framework 170 from the lower ends of front lower pillar 178 to the side tube 185 to close the inboard side of cab 15. The side plate 186 has an arcuate cutout 188 in the lower back thereof to clear the front wheel and tire assembly therebehind and angles inwardly above the shoulder line of the operator with the frame work 170. An inboard side window 189 is provided in the inwardly angled portion of the side plate 186. The outboard side of framework 170 is closed by a side plate 190 that is a mirror image of side plate 186 with cutout 191 and outboard window 192. The forward driver access opening 176 is defined by cross tube 181, upper pillars 180, the front ends of legs 175, and the front support pillars 178.

A bottom plate 195 extends between the bottom edges of side plates 186 and 190 to close the bottom of cab 15 and is provided with an inwardly turned keeper ledge 196 at the front of the cab to form the bottom of access opening 176. A lower back panel 198 extends downwardly from the base 174 of yoke 172 to bottom plate 195 between side plates 186 and 190 to close the lower back of cab 15. The panel 198 conforms generally to the shape of cutouts 188 and 191 and is provided with a forwardly projecting seat support ledge 199 as will become more apparent. An upper panel 200 extends upwardly from the back of yoke 172 along side tubes 185 and then forwardly to the front cross tube 181 between side plates 186 and 190 to close the upper back and top of cab 15. A back window 201 is provided in panel 200 and a clearance dimple 201 is defined in the top portion of panel 200 immediately behind and centrally located with respect to front cross tube 181 as will become more apparent.

The operator access opening 176 is selectively closed by a door 210 which is pivoted on the inside of side tubes 185 immediately behind the front cross tube 181. The door 210 has a door frame 211 formed by side angles 214, bottom angle 215 connecting side angles 214 at their lower ends and top angle 216 connecting side angles 214 at their upper ends. The frame 211 is shaped to just cover opening 176 and each of the angles 214-216 include an outwardly directed flange 218 that engages the framework 170 of cab 15 about opening 176 and a rearwardly extending reinforcing rib 219 which projects rearwardly into opening 176 adjacent framework 170. Cross braces 220 connect the side angles 214 and a panel 221 covers the lower front of door frame 121 to a level just above the tops of legs 175 of yoke 172. This leaves a top opening 222 through frame 211 so that the operator can see therethrough.

The door 210 is hinged to side tubes 185 by a pair of spaced apart hinge ears 225 which are attached to the upper ends of the reinforcing ribs 219 of side angles 214. The hinge ears 225 extend first rearwardly and then upwardly behind the front cross tube 181 so as to define an upwardly opening recess therein into which the tube 181 is received as the door 210 is opened. The upper rear ends of ears 225 are pinned to the side tubes 185 by pins 228. Thus, it will be seen that the bottom of door 210 swings upwardly and outwardly to open cab 15. A pair of openers 229 pinned between the hinge ears 225 and side tubes 18 may be used to urge the door 210 toward its open position to assist the operator in opening the door. The openers 229 may be spring or fluid powered.

The door 210 is held closed by a lock mechanism 230 mounted on panel 221. The mechanism 230 has an outside handle 231 within a recess 232 in panel 221 and an inside handle 234 behind panel 221. Latchs 235 extend outwardly from the bottom and sides of door 210 to engage appropriate holes in the cab framework 170 about opening 176. Appropriate weatherstripping 236 seals the door 210 when closed.

The door 210 is held open by a catch mechanism 240 centrally mounted in the front cross tube 181 of framework 170 as best seen in FIGS. 17-19. The mechanisms 240 includes a tubular housing 241 extending through cross tube 181 normal to the centerline of the tube and at an angle α with the horizontal. A plunger 242 is slidably carried in housing 241 with a cylindrical catch 244 projecting from the front end of housing 241 and a reduced diameter portion 245 projecting from the rear end of housing 241 to form a drive shoulder 246 within housing 241. An abuttment 248 closes the rear end of housing 241 and slidably supports the portion 245 projecting rearwardly therethrough. A combination torsion and compression spring 249 is positioned between the drive shoulder 246 and abuttment 248 within housing 241 around the portion 245. The front end of spring 249 is attached to catch 244 and the opposite end is attached to abuttment 248. Thus, spring 249 constantly urges the catch 244 toward its extended position seen in FIG. 17 and constantly urges the plunger 242 in a clockwise direction seen in FIG. 19 as will become more apparent. An arm 250 on the rear projecting end of the reduced diameter portion 245 of plunger 242 is used to rotate plunger 242 and serves as a stop to limit the extension of catch 244 from the front of housing 241 by engagement with the back of abuttment 248 as seen in FIG. 17. A check 251 on the cross tube 181 serves to limit the clockwise rotation of arm 250 and plunger 242 under the influence of spring 249.

The front end of catch 244 has been chamfered at 255 so that the chamfer 255 lies on the bottom of catch 244 when arm 250 engages the check 251 as seen in FIGS. 17 and 19. The forwardmost top lip 256 on catch 244 is arranged to extend under the reinforcing rib 219 on the top angle 216 of door 210 when the door is open as seen in FIG. 17 by the action of spring 249. The chamfer 255 now underlies the rib 219 so that when the arm 250 is rotated counterclockwise manually by pull chain 258, the lip 256 releases rib 219 onto chamfer 255. The weight of door 210 then forces the catch 244 back into housing 241 against spring 249 to allow the door to close against bumpers 259. When chain 258 is released, spring 249 rotates plunger 242 and arm 250 clockwise against check 251 to again place lip 256 in its operative position.

The top opening 222 in door 210 is closed by a windshield/guard assembly 260 best seen in FIGS. 20 and 21 that can be quickly removed in order that opening 222 serves as an escape hatch for the operator. The windshield/guard assembly 260 includes a windshield 261 sized to just cover opening 222. A weatherstrip 262 extends around windshield 261 and locator tabs 264 on the door frame 211 laterally position windshield 261 over opening 222 but allow it to be pushed outward for removal. An expanded metal guard 265 sized so that its frame 266 just fits over windshield 261 is hinged to the door 210 just below opening 222 so that it can be pivoted upwardly over windshield 261 to hold it in place. Corner gussets 268 are provided across the upper corners of the guard frame 266 outside of windshield 261 which overlies like latch gussets 269 connected between side and top angles 214 and 216 at the upper corners of opening 222. Aligned apertures 270 are provided through both gussets 268 and 269. A conventional ball lock pin assembly 271 is received through each aligned pair of apertures 270. The release end of assembly 271 is inside cab 15 with its body 272 extending through apertures 270. The head 274 is against the latch gussets 269 and the releasably extended balls 275 project forwardly of corner gusset 268. This holds the guard 265 and windshield 261 in place but when the release pins 276 in assemblies 271 are pulled to allow balls 275 to retract into body 272, the guard 265 pivots down and windshield 261 can be pushed forward to open the opening 222 and allow the operator to escape therethrough.

The seat bottom 280 seen in FIGS. 15 and 16 for the operator is mounted on the seat support ledge 199 in the lower back panel 198 of cab 15. The seat bottom 280 has a short top support surface 281 and a front support surface 282 as will become more apparent. A seat back 284 is mounted above and behind seat bottom 280 on yoke 172 with a head rest 285 thereon. Arm rests 283 are provided on the tops of legs 175 of yoke 172.

A foot seat 286 is mounted in the bottom of cab 15 on an upstanding support bracket 288 as seen in FIGS. 15 and 16. The foot rest 286 has an upstanding ledge 289 thereacross to fit ahead of the operator's heels. The back edges of the upstanding sides 290 of rest 286 are provided with hooks 291 which are removably supported in slots 292 in bracket 288.

The operator stands on the foot rest 286 so that the ledge 289 keeps his feet in position. As the operator faces forward, he leans back so that his buttocks rest on the top surface of seat bottom 280 to partially support his weight. The backs of his legs rest against the front surface of the seat bottom 280. A lap strap 294 and shoulder straps 295 hold the operator in position so that his weight is carried by his feet and legs in combination with his buttocks so that he can rest his forearms on the arm rests 283 on yoke 172.

The operator then drives the vehicle 10 with his left hand through the single stick control unit 300 and operates the bed controls 301 on control panel 302 with his right hand. The control panel 302 is hinged on the right side of the cab 15 as indicated at 304 so that it can be swung up out of the way for entering and exiting the cab 15. The stick control unit 300 is located closely adjacent the left leg 175 of yoke 172.

OUTRIGGER

Figure 2:
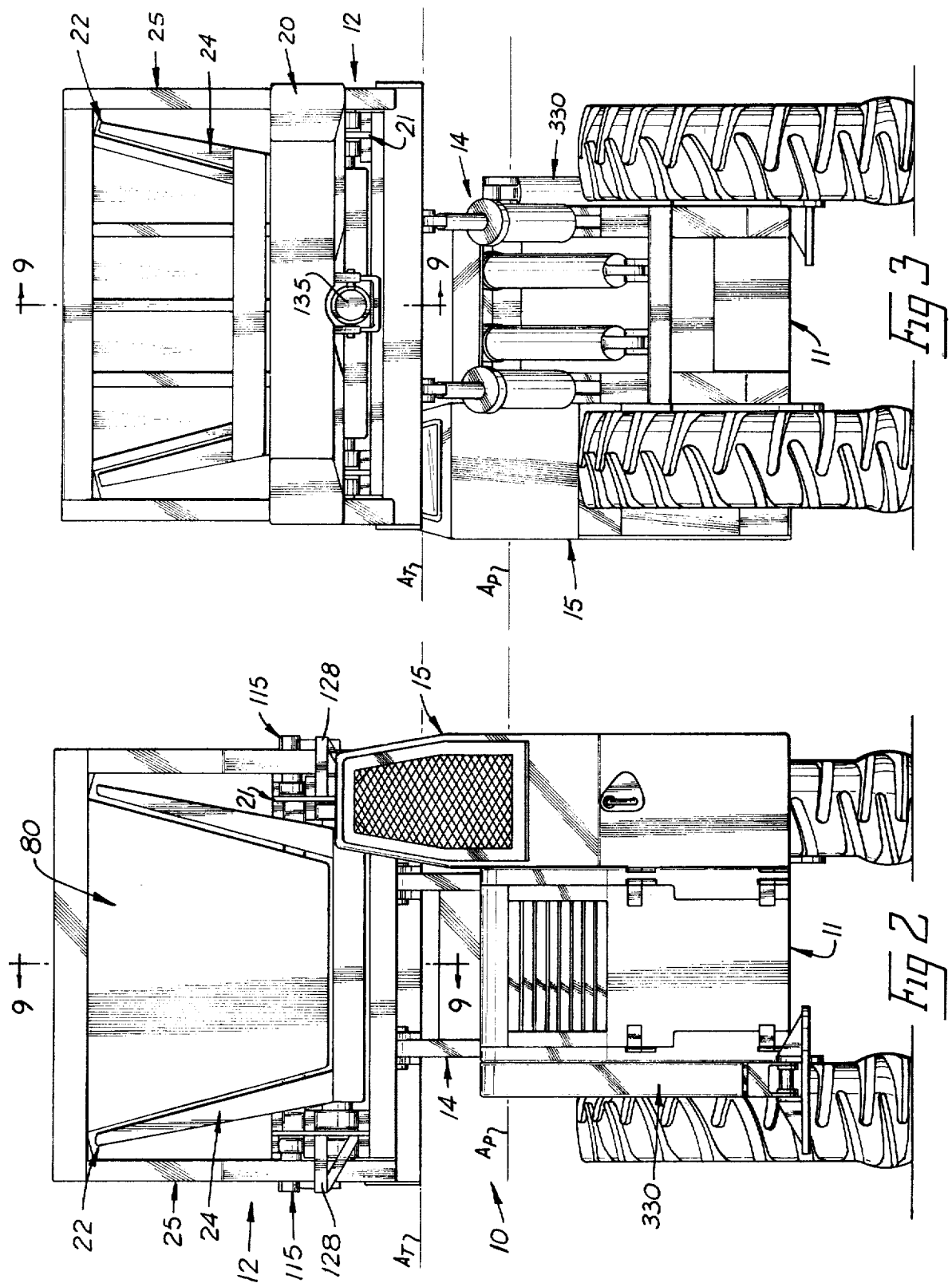
FIG. 2 is a front end view of the vehicle of FIG. 1.

An outrigger 330 is mounted on the front end of the base subassembly 11 opposite cab 15 which serves to extend the effective support area of the vehicle 10 during the unloading of trees therefrom as will become more apparent. As best seen in FIGS. 2 and 24, the outrigger 330 includes a support tube 331 mounted on the side of base frame 16 and extending downwardly and forwardly at an angle β with the horizontal. An extension tube 332 is slidably mounted in tube 331 and projects from the lower end thereof. A hydraulic cylinder 334 is pinned to pivot ears 335 on support tube 331 with its piston rod 336 pinned to pivot ears 338 on extension tube 332 to extend and retract tube 332. A ground engaging plate 339 is pivoted on the end of tube 332 to engage the ground as the tube 332 is deployed to add support at the front end of vehicle 10.

CONTROLS

The single stick control unit 300 is mounted on a bracket 305 depending from the bottom of the left leg 175 of yoke 172 adjacent its front end. The unit 300 includes a conventional double four-way directional control valve 306 depending from the rear end of bracket 305 as seen in FIGS. 22 and 23. The valve 306 is the same type as described in my above referenced copending application for remotely controlling the control levers on the primary pumps on the base subassembly 11 through positioners (not shown). The control plungers 308 of valve 306 movably project upwardly through bracket 305 generally vertically and parallel to each other so that their ball ends 309 are above bracket 305.

A control stick assembly 310 is pivoted on the inside of bracket 305 by shaft 311 so that the assembly 310 pivots about a transversely extending pivot axis $A_1$ spaced forwardly of the plungers 308 in valve 306. A pivot support member 312 attached to shaft 311 extends rearwardly therefrom toward plungers 308. A transversely extending drive block 314 is pivoted to the rear end of member 312 on a shoulder screw 315 so that the block 314 pivots about axis $A_2$ in a plane in which the centerlines of both plungers 308 lie with the axis $A_2$ located equidistance from the centerlines of the plungers 308. The block 314 has a cylindrical passage 316 extending longitudinally therethrough which opens onto the bottom of block 314 through a longitudinally extending slot 318. The ball ends 309 on plungers 308 are slidably received in passage 316 on opposite sides of shoulder screw 315 with the plungers 308 extending downwardly through slot 318. Thus, it will be seen that as the block 314 is moved, it will move plungers 308 to vary the output of the primary pumps in the subassembly 11.

A support tube 320 is attached to the pivot support member 312 and extends upwardly therefrom generally perpendicular to both axis $A_1$ and $A_2$. A control handle 321 is pivoted on the top of tube 320 between pivot ears 322 so that it pivots about an axis $A_3$ generally parallel to and spaced above the pivot axis $A_2$ of the drive block 314. Thus, it will be seen that as the handle 321 is moved fore and aft the tube 320, member 312, and drive block 314 will be pivoted therewith about the pivot axis $A_1$ to simultaneously raise or lower the plungers 308 equally.

The handle 321 is also connected to the drive block 314 outboard of the ourboard plunger 308 by a drive rod 324 with a ball joint 325 at its upper end connecting it to handle 321 and a ball joint 326 at its lower end connecting it to block 314. Thus, as handle 321 is pivoted from side-to-side about axis $A_3$, one of the plungers 308 will be raised while the other plunger 308 will be simultaneously lowered since block 314 pivots about axis $A_2$.

From the above, as handle 321 is moved forwardly, the vehicle 10 will move forwardly; as handle 321 is moved rearwardly, the vehicle will move rearwardly; as the handle is moved to the left, the vehicle will turn to the left; and as the handle 321 is moved to the right the vehicle will turn to the right. Thus, the vehicle uses the skid steer principle and is controlled by the single handle 321 with the operator's left hand.

The hydraulic circuit 345 is best seen in FIG. 25 for controlling the catch bed assembly 12 and positioning linkage 14. Circuits 345 includes a common pressure line 346 connected to the output of the auxiliary hydraulic pump 348 through solenoid dump valve 1SV and a common return line 349 to reservoir 350. A three position bed height solenoid valve 2SV connects lines 346 and 349 to positioning cylinders 152 in parallel with each other. A three position belt tilt solenoid valve 3SV connects lines 346 and 349 to tilt cylinders 151 in parallel to each other. A three position unload solenoid valve 4SV connects the lines 346 and 349 to the bed extension cylinder 135 and a three position outrigger solenoid valve 5SV connects lines 346 and 349 with the outrigger extension cylinder 334. The operation of this circuit will become more apparent.

ELECTRICAL CONTROL CIRCUIT

The electrical control circuit 360 as seen in FIG. 26 controls the operation of the catch bed assembly 12 and positioning linkage 14. The circuit 360 includes a common hot wire 361 connected to the hot side of a 12 volt DC power source through a push-pull power switch P-1; a common relay ground wire 362 connected directly to the ground side of the 12 Volt DC power source; and a common sllenoid ground wire 364 connected to the ground side of the 12 volt DC power source through the normally closed contacts 19CR-1 of the hold control relay 19CR.

The solenoid 1SV-1 of dump valve 1SV is connected to the common solenoid ground wire 364 on its ground side and to hot wire 361 through the normally closed contacts of pressure switch 9PS in the high pressure hydraulic line 346 of the hydraulic circuit 345 in series with the normally open contacts 1CR-1 of the bed "up" control relay 1CR. The normally open contacts 2CR-1 of bed "down" control relay 2CR, normally open contacts 3CR-1 of the tilt up control relay 3CR, normally open contacts 4CR-1 of the tilt down control relay 4CR, normally open contacts 6CR-1 of the bed "extend" control relay 6CR, normally open contacts 8CR-1 of the bed "retract" control relay 8CR, normally open contacts 10CR-1 of the outrigger up control relay 10CR, and normally open contacts 11CR-1 of the outrigger down control relay 11CR in parallel with each other are connected in parallel across contacts 1CR-1. Thus, it will be seen that when the solenoid 1SV-1 is energized, the hydraulic line 346 will be pressurized to supply pressure to the other solenoid valves in hydraulic circuit 345.

The up solenoid 2SV-1 of the bed height solenoid valve 2SV has its ground side connected to the common solenoid ground wire 364 and its other side connected to the common hot wire 361 through normally open contacts 1CR-2 of the bed up control relay 1CR in series with the normally open contacts 8PS-2 of the outrigger down pressure switch 8PS in series with the normally open contacts 2LS-1 of the tilt down limit switch 2LS in series with the normally closed contacts 1PS-2 of pressure switch 1PS in the extend pressure line to positioning cylinders 152 in series with the normally open contacts 1SS-1 of the bed height selector switch 1SS. The coil 1CR-C of the relay 1CR is connected between the common point between contacts 1CR-1 and 8PS-2 and the relay ground wire 362. The normally open contacts 3LS-1 of cam tilt limit switch 3LS and normally open contacts 1CR-3 of relay 1CR are each connected in parallel across the normally open contacts 2LS-1. The normally open contacts 12CR-1 of the automatic bed "unload ready" relay 12CR are connected in parallel across the contacts 1SS-1. The coil 17CR-C of the unload enable relay 17CR is connected between common relay ground wire 362 and the normally open contact 1PS-2 of pressure switch 1PS.

The down solenoid 2SV-2 of the bed height solenoid valve 2SV is connected to the common solenoid ground wire 364 on its ground side and its other side is connected to common hot wire 361 through normally open contacts 2CR-2 of the bed down enable relay 2CR in series with the normally open contacts 2PS-2 of pressure switch 2PS in the extend pressure line to the positioning cylinders 152 in series with the normally open contacts 1SS-2 of the bed height selector switch 1SS. The normally open contacts 1LS-1 of tilt up limit switch 1LS and normally open contacts 3LS-2 of limit switch 3LS are each connected in parallel across the contacts 2CR-2 and the relay coil 2CR-C of relay 2CR is connected between common relay ground wire 362 and the common point between contacts 1LS-1 and 2CR-1 and the solenoid 2SV-2. The normally open contacts 14CR-1 of the bed "load ready" control relay 14CR are connected in parallel across the contacts 1SS-2, and the normally open contacts 9CR-1 of the automatic bed return control relay 9CR in series with the normally open contacts 5CR-1 of the automatic unload control relay 5CR are also connected in parallel across the contacts 1SS-2. The normally open contact 2PS-1 of pressure switch 2PS is connected to the coil 15CR-C of the automatic outrigger up control relay 15CR which is in turn connected to the common relay ground wire 362.

The tilt up solenoid 3SV-1 of the bed tilt solenoid valve 3SV has its ground side connected to the common solenoid ground wire 364 and its other side connected to the common hot wire 361 through the normally closed contacts 3CR-2 of the tilt up control relay 3CR in series with the normally closed contacts 1LS-2 of tilt up limit switch 1LS in series with the normally closed contacts of the pressure switch 3PS in the retract pressure line of the tilt hydraulic cylinders 151 in series with the normally open contacts 2SS-1 of the bed tilt selector switch 2SS. Normally closed contacts 3LS-3 of limit switch 3LS are connected in parallel across contacts 1LS-1. The coil 3CR-C of the relay 3CR is connected between the common relay ground wire 362 and the common point between contacts 3CR-2 and 1LS-2. Normally open contacts 9CR-2 of the relay 9CR in series with normally open contacts 5CR-2 of relay 5CR are connected in parallel across the normally open contacts 2SS-1.

The tilt down solenoid 3SV-2 of the bed tilt solenoid valve 3SV has its ground side connected to the common solenoid ground wire 364 and its other side connected to the hot wire 361 through the normally open contacts 4CR-2 of the tilt down control relay 4CR in series with the normally closed contacts 2LS-2 of tilt down limit switch 2LS in series with normally closed contacts 3LS-4 of cam tilt limit switch 3LS in series with the normally closed contacts of the pressure switch 4PS in the extend pressure line of tilt cylinders 151 in series with the normally open contacts 2SS-2 of bed tilt selector switch 2SS. The coil 4CR-C of relay 4CR is connected between the common relay ground wire 362 and the common point between contacts 4CR-2 and contacts 2LS-2. Normally open contacts 12CR-2 of relay 12CR are connected in parallel across the contacts 2SS-2 and the normally open contacts 14CR-2 of relay 14CR are also connected in parallel across the contacts 2SS-2.

The ground side of the coil 5CR-C of the automatic unload control relay 5CR is connected to the common relay ground wire 362 and its other side is connected to the common hot wire 361 through the normally open contacts 1PS-3 of pressure switch 1PS in series with the normally open contacts of auto unload push bottom switch PB-1 in series with the normally closed contacts 16CR-1 of the automatic unload disable relay 16CR. The normally open holding contacts 5CR-3 of relay 5CR are connected in parallel across the switch PB-1.

The coil 12CR-C of the bed unload ready control relay 12CR is connected to the common relay ground wire 362 on its ground side and its other side is connected to the common hot wire 361 through the normally open contacts of unload ready push button switch PB-2 in series with the normally closed contacts 17CR-2 of relay 17CR. The normally open holding contacts 12CR-3 of relay 12CR are connected in parallel across the contacts of switch PB-2. The coil 14CR-C of relay 14CR has its ground side connected to common relay ground wire 362 and its other side connected to common hot wire 361 through the normally open contacts of load ready push button switch PB-2 in series with the normally closed contact 15CR-1 of the relay 15CR. The normally open holding contacts 14CR-3 of the relay 14CR are connected in parallel across the contacts of switch PB-3.

The coil 6CR-C of the bed extend control relay 6CR has its ground side connected to the common relay ground wire 362 and its other side connected to the common hot wire 361 through normally closed contacts 9CR-3 of relay 9CR in series with normally closed contacts 5PS-1 of pressure switch 5PS in the extend pressure line to the extension cylinder 135 in series with the normally closed contacts 7CR-1 of the bed retract enable control relay 7CR in series with the normally open contacts 5CR-3 of relay 5CR. Normally closed contacts 5CR-4 in series with the normally open contacts 3SS-1 of the manual unload selector switch 3SS connect common hot wire 361 with the common point between contacts 5PS-1 and contacts 7CR-1. The coil 18CR-C of the manual bed retract control relay 18CR has its ground side connected to the common relay ground wire 362 and its other side connected to the common hot wire 361 through the normally open contacts 3SS-2 of switch 3SS in series with the normally closed contacts 5CR-4. The coil 7CR-C of the automatic bed retract enable relay 7CR has its ground side connected to the common ground wire 362 and its other side connected to the common hot wire 361 through the normally open contacts 5PS-2 of pressure switch 5PS in series with the normally open contacts 5CR-3. Normally open holding contacts 7CR-2 of relay 7CR are connected in parallel across the contacts 5PS-2. The coil 8CR-C of the bed retract control relay 8CR has its ground side connected to the common relay ground wire 362 and its hot side connected to the common hot wire 361 through the normally closed contacts 9CR-4 in series with the normally closed contacts 6PS-1 of the pressure switch 6PS in the retract pressure line of the extension cylinder 135 in series with the normally open contacts 7CR-3 of relay 7CR in series with normally open contacts 5CR-3. The coil 9CR-C of the automatic bed return control relay 9CR is connected between the normally open contact 6PS-2 of pressure switch 6PS and the common relay ground wire 362. Normally open holding contacts 9CR-5 of relay 9CR are connected in parallel across the normally open contact 6PS-2.

The extend solenoid 4SV-1 of the unload solenoid valve 4SV has its ground side connected to the common solenoid ground wire 364 and its other side connected to the normally open contacts 1PS-4 of pressure switch 1PS in series with the normally open contacts 8PS-3 of pressure switch 8PS in series with the normally open contacts 6CR-2 of the bed extend control relay 6CR. The retract solenoid 4SV-2 of valve 4SV has its ground side connected to the common solenoid ground wire 364 and its hot side connected to the common hot wire 361 through the normally open contacts 8CR-1 of bed retract relay 8CR. The normally closed contacts 6CR-3 of relay 6CR in series with the normally open contacts 18CR-1 of relay 18CR are connected in parallel across the contacts 8CR-1.

The up solenoid 5SV-2 of the outrigger control valve 5SV has its ground side connected to the common solenoid ground wire 364 and its other side connected to the common hot wire 361 through the normally open contacts 10CR-2 of the outrigger up control relay 10CR in series with the normally closed contacts 7PS-2 of the pressure switch 7PS in the retract pressure side to outrigger hydraulic cylinder 334 in series with the normally open contacts 5CR-5 of relay 5CR in series with the normally open contacts 15CR-2 of the relay 15CR. The coil 10CR-C of the relay 10CR is connected between the common relay ground wire 362 and the common point between contacts 10CR-2 and contacts 7PS-2. The normally open contacts 4SS-1 of the outrigger selector switch 4SS are connected across contacts 15CR-2 and 5CR-5 in parallel therewith. The coil 16CR-C of the automatic elect disable control relay 16CR is connected between the common relay ground wire 362 and the normally open contact 7PS-1 of the pressure switch 7PS.

The down solenoid 5SV-1 of the outrigger control valve 5SV has its ground side connected to the common solenoid ground wire 364 and its other side connected to the common hot wire 361 through the normally open contacts 11CR-2 of the outrigger down control relay 11CR in series with normally closed contacts 8PS-1 of the pressure switch 8PS in the extend pressure line of the outrigger cylinder 374 in series with the normally open contacts 4SS-2 of the selector switch 4SS. Normally open contacts 12CR-4 of relay 12CR and normally open contacts 6CR-4 of relay 6CR are each connected in parallel across the normally open contacts 4SS-2. Coil 11CR-C of the relay 11CR is connected between the common relay ground wire 362 and the common point between contacts 11CR-2 and 8PS-1.

The coil 19CR-C of the "hold" control relay 19CR has its ground side connected to the common relay ground wire 362 and its other side connected to the hot wire 361 through the normally open contacts of the hold push button switch PB-4. Thus, it will be seen that when switch PB-4 is closed, the contacts 19CR-1 are open to disconnect all of the solenoids from ground and de-energize them to stop the operation of the positioning linkage 14 and the catch bed assembly 12 while at the same time allowing all of the control relays to remain energized to reactivate the bed assembly 12 and the positioning linkage 14 at the same point in the operation to allow the operation thereof to continue when the push button switch PB-4 is released.

The location of the tilt down limit switch 2LS and tilt up limit switch 1LS are shown in FIGS. 27 and 28. The switch 2LS is located on one of the arms 154 at its upper end. The actuator 370 of switch 2LS is located so that detent 371 on the front of the upper front pivot ear 35 depresses actuator 370 to transfer switch 2LS when the arms 154 are lowered and the bed assembly 12 is tilted down to its load position seen in FIGS. 1, 4 and 27. The switch 1LS is also located on the arm 154 at tis upper end. The actuator 374 of switch 1LS is located so that detent 375 on the bottom of the upper front pivot ear 35 depresses actuator 374 to transfer switch 1LS when the arms 154 are raised and the bed assembly 12 is in its unload position seen in FIGS. 6 and 28. The location of the cam tilt limit switch 3LS is best seen in FIG. 29 and is located on one of the stanchions 150 of the base subassembly 11 adjacent the lower end of one of the arms 154. The lower end of arm 154 is provided with a cam 376 that rotates about the pivot axis $A_p$ of the lower ends of arms 174. The cam 376 is provided with a rise portion 378 arranged to depress the actuator 379 of switch 3LS to transfer it as the arms 154 are moved from their up to their down position and vice versa, but releases the actuator 379 when the arms 154 are in their up or in their down position. Thus, switch 3LS is a safety switch to prevent operation of the tilt control unless the bed assembly 12 is either up or down.

OPERATION

Figure 4:
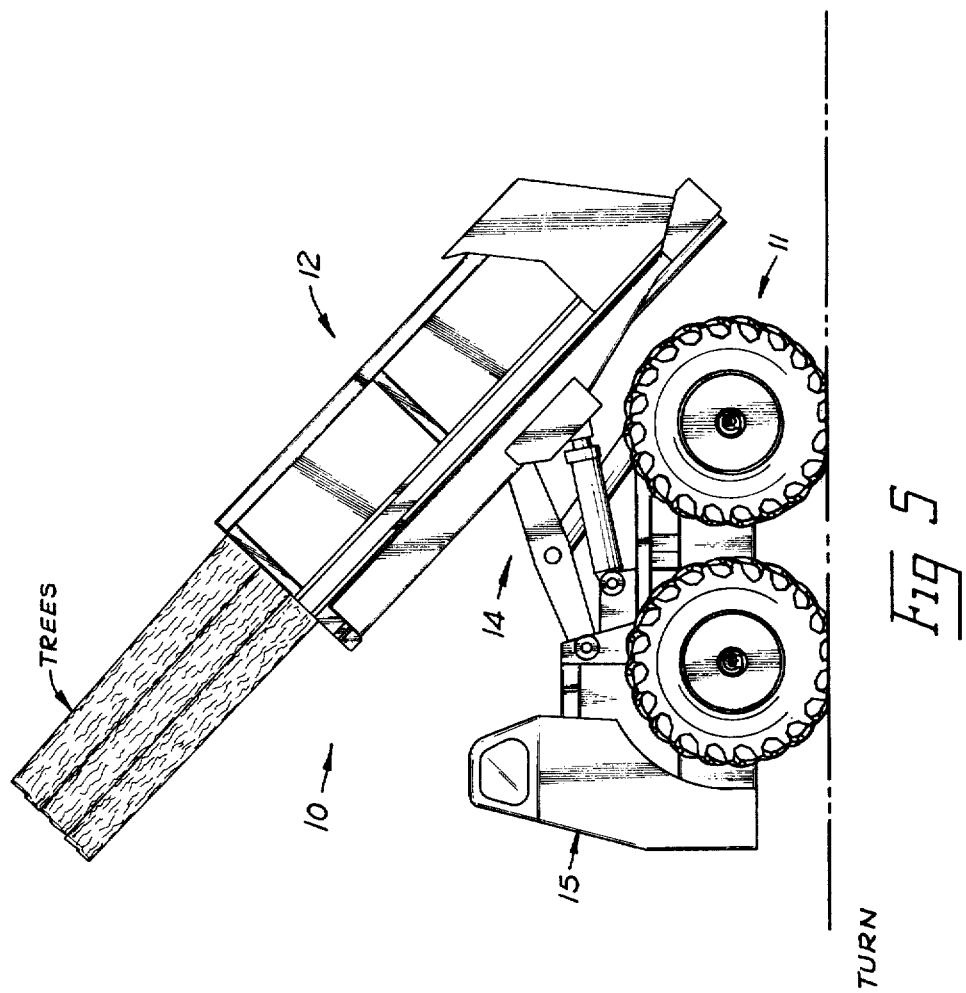
FIG. 4 is a reduced schematic side view of the vehicle being loaded.
Figure 5:
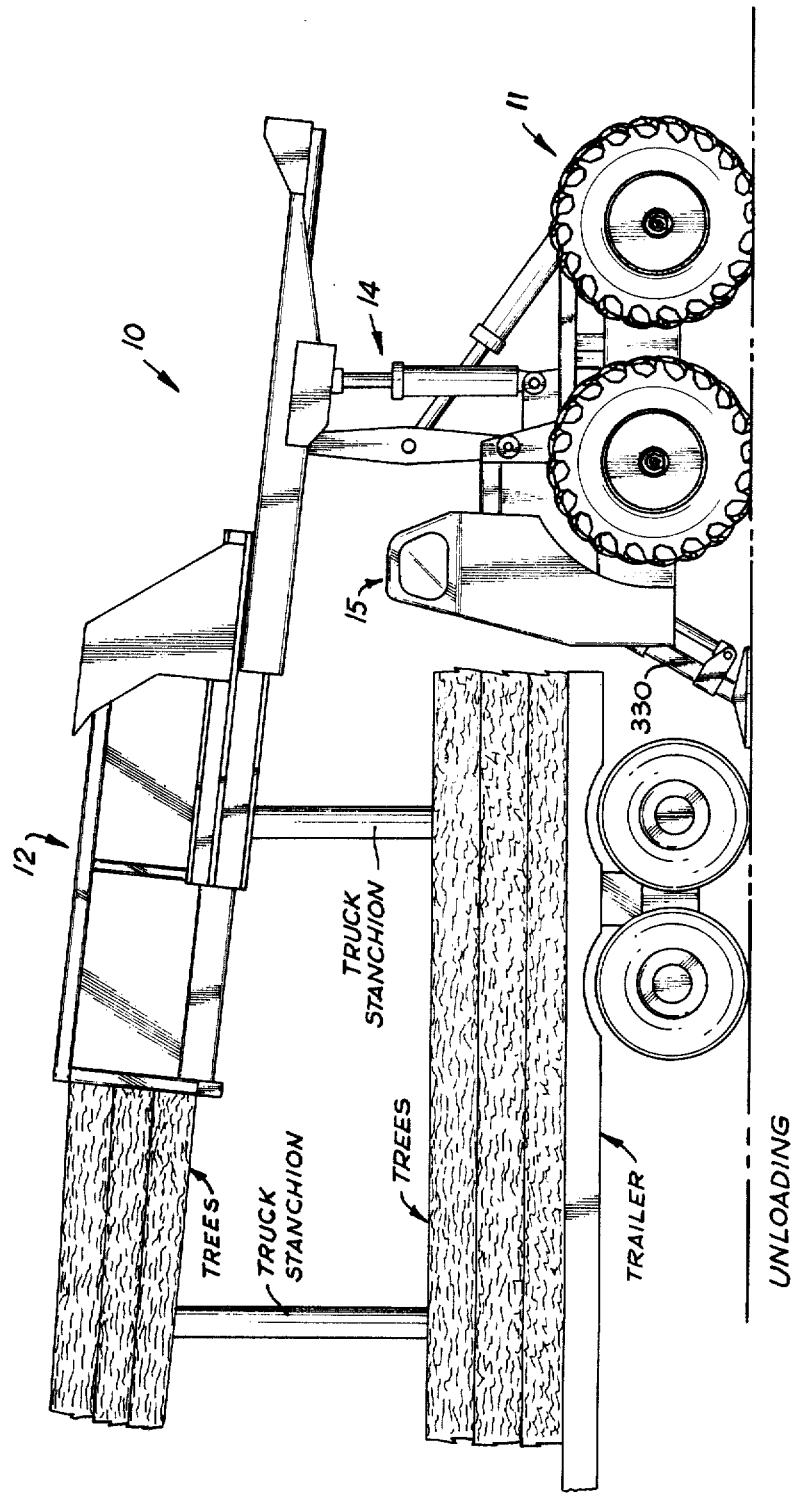
FIG. 5 is a reduced schematic side view of the vehicle during turning.

Basically, the bed assembly 12 has four positions: the load position shown in FIGS. 1 and 4; the turn position shown in FIG. 5; the unload position shown in FIG. 6A; and the eject positions in FIGS. 6 and 7. The positioning arm subassembly 150 has two basic positions, one in which the arms 154 are vertical as seen in FIGS. 6 and 7 and one in which the arms 154 are angled back as seen in FIGS. 1, 4 and 5.

Starting with the catch bed subassembly 12 in the load position shown in FIGS. 1 and 4, the operator maneuvers the vehicle 10 with the single stick control unit 300 until the centerline of the vehicle 10 is aligned with a tree harvesting machine such as that disclosed in application Ser. No. 293,482 and spaced from the harvester so that the heel plate subassembly 25 is located from the discharge end of the harvester by a distance substantially equal to the length of the delimbed tree to be received in chamber 80 in bed 24. After the chamber 80 is filled, the operator then drives the vehicle out of the woods to a loading area to unload the trees onto a truck or trailer as seen in FIGS. 6 and 7. Because the center of gravity of the trees lies within bed 24, the vehicle is relatively stable.

When the operator makes a turn, he closes contacts 2SS-1 of tilt control switch 2SS to energize relay 3CR and solenoid 3SV-1 on valve 3SV. This causes the piston rods 160 in tilt cylinders 151 to retract until they bottom to open switch 3PS and stop bed assembly 12 in the position seen in FIG. 5. The center of gravity of the trees are shifted rearwardly in the vehicle so that the turning moment is reduced and the vehicle stabilized. After the turn is made, the operator closes contacts 2SS-2 of switch 2SS to energize relay 4CR and solenoid 3SV-2 of valve 3SV. This causes the piston rods 160 in tilt cylinders 151 to extend until the detent 371 transfers limit switch 2LS to open contacts 2LS-2 and stop the bed assembly 12 in its load position.

When the operator reaches the truck or trailer at the loading area, he drives the vehicle 10 to a position so that the centerline of the vehicle 10 is aligned with that of the truck or trailer and the vehicle 10 is spaced from the trailer as seen in FIG. 6A. The operator may automatically raise the bed assembly 12 to the upper unload position by depressing push button switch PB-2 to energize relay 12CR. This closes contacts 12CR-4 to energize relay 11CR and solenoid 5SV-1 in valve 5SV to extend piston rod 336 in cylinder 335 until the plate 339 engages the ground to transfer pressure switch 8PS.

Because contacts 12CR-1 are closed and detent 371 is holding contacts 2LS-1 closed, transferring switch 8PS closes contacts 8PS-2 to energize relay 1CR and solenoid 2SV-1 of valve 2SV to extend piston rods 162 in positioning cylinder 152 and raise the bed assembly 12. The piston rods 162 continue to extend even through detent 371 clears switch 2LS since contacts 1CR-3 are closed until the piston rods bottom in the position shown in FIG. 6A to transfer pressure switch 1PS. This energizes relay 17CR to de-energize relay 12CR and stop the bed assembly 12 in its unload position seen in FIG. 6A.

The bed assembly 12 may alternatively be raised from its load position in FIG. 4 to unload position in FIG. 6A using the selector switch 1SS. First the operator must lower the ground engaging plate 339 of the outrigger 330 by closing contacts 4SS-2 of selector switch 4SS to energize relay 11CR and solenoid 5SV-1 until pressure switch 8PS transfers to close contacts 8PS-2. The operator then closes contacts 1SS-1 to energize relay 1CR and solenoid 2SV-1 since the contacts 2LS-1 are closed by detent 371 when the bed assembly 12 is in its load position. As the bed assembly 12 moves up, the detent 371 releases switch 2LS but holding contacts 1CR-1 maintain solenoid 2SV-1 energized until switch 1PS is transferred or contacts 1SS-1 opened.

The operator is now ready to eject the trees onto the truck or trailer. If the operator wants to automatically eject the trees, he depresses push button switch PB-1. Because contacts 1PS-3 are closed, relay 5CR is energized which in turn energizes relay 6CR by closing contacts 5CR-3. This closes contacts 6CR-2 to energize solenoid 4SV-1 of valve 4SV since contacts 8PS-3 and 1PS-4 are now closed. The cylinder 135 then drives the bed 24 out to its extended position as seen in FIG. 6 moving the heel plate subassembly 25 therewith until the piston rod 136 bottoms to transfer pressure switch 5PS opening contacts 5PS-1 to de-energize relay 6CR. When the bed 24 and heel plate subassembly 25 are fully extended, the latches 119 of interlock mechanisms 115 latch behind the locking faces 125 of keepers 122 to hold the heel plate subassembly 25 in its extended position.

When pressure switch 5PS transfers, contacts 5PS-2 close to energize relay 7CR since contacts 5CR-3 are still closed. This closes contacts 7CR-3 to energize relay 8CR to close contacts 8CR-1 and energize solenoid 4SV-2 to retract bed 24 while the latches 119 hold the heel plate subassembly 25 in its extended position. The bed 24 is retracted until the piston rod 136 in cylinder 135 bottoms to transfer pressure switch 6PS and de-energize relay 8CR. As the bed 24 reaches its fully retracted position as seen in FIG. 7, the release cams 126 on the front of slide rails 50 drive the latches 119 upwardly to clear keepers 122 and release heel plate assembly 25.

When pressure switch 6PS transfers to close contacts 6PS-2, relay 9CR is energized. If the operator has manually tilted the bed down during the ejecting operation using the selector switch 2SS, then the bed assembly 12 is tilted back up to its load attitude when contacts 9CR-2 close to energize relay 3CR and solenoid 3SV-1 since contacts 5CR-2 are already closed. When the bed assembly 12 reaches its load attitude, limit switch 1LS is transferred to de-energize solenoid 3SV-1.

When limit switch 1LS is transferred to stop bed assembly 12 in its load attitude, contacts 1LS-1 close to energize solenoid 2SV-2 and relay 2CR since contacts 9CR-1 and contacts 5CR-1 are already closed. This causes the positioning arm subassembly 150 to be pivoted rearwardly to lower the bed assembly 12 back to its load position shown in FIG. 1 until the pistons 162 in lift cylinders 152 bottom to transfer pressure switch 2PS.

When pressure switch 2PS transfers, contact 2PS-1 is closed to energize relay 15CR. This closed contacts 15CR-2 to energize relay 10CR and solenoid 5SV-2 of valve 5SV since contacts 5CR-5 are already closed. This raises the ground engaging plate 339 until piston rod 336 bottoms in cylinder 334 to transfer pressure switch 7PS. This energizes relay 16CR to open contacts 16CR-1 and de-energize relay 5CR to terminate the automatic ejection operation with the trees ejected onto the truck or trailer. The operator then drives the vehicle 10 back to the harvesting site to receive more trees.

The ejection of the trees may be manually operated using the selector switch 3SS to extend and retract bed 24. The operator can then lower the bed assembly 12 back to its load position with push button switch PB-3 or selector switch 1SS and raise the ground engaging plate 339 of outrigger 330 with selector switch 4SS.

While specific embodiments of the invention have been disclosed herein, it is to be understood that full use may be made of substitutions, modifications, and equivalents without departing from the scope of the inventive concept.

I claim:

1. A tree transporting vehicle comprising:
   a base subassembly having a support frame and ground engaging means for moving said base subassembly;
   a catch bed assembly for receiving the trees to be transported and supporting the trees therein above said base subassembly, said catch bed assembly including:
   a carriage frame;
   a catch bed movably carried by said carriage frame and defining a tree receiving chamber therein with open front and rear ends and an open top;
   a heel plate assembly movably carried by said carriage frame and extending into said tree receiving chamber;
   tie means interconnecting said bed and said heel plate assembly so that said heel plate assembly is moved with said bed as said bed is moved forwardly in said carriage frame but said bed moves rearwardly in said carriage frame independently of said heel plate assembly; and,
   interlock means operatively connecting said carriage frame, said bed and said heel plate assembly to selectively lock said heel plate assembly in its forwardmost position and to release said heel plate assembly from its locked position when said bed is in its rearmost retracted position for said heel plate assembly to move to its rearmost retracted position independently of said bed; and,
   a positioning linkage operatively connecting said catch bed assembly with said support frame, said positioning linkage movably positioning said catch bed assembly with respect to said base subassembly to receive the trees and to discharge the trees therefrom.

2. The tree transporting vehicle of claim 1 wherein said positioning linkage includes an extendable link four bar linkage so that said catch bed assembly can be raised and lowered while maintaining the tilt attitude of said bed assembly substantially constant.

3. The tree transporting vehicle of claim 2 wherein said four bar linkage comprises a pair of spaced apart arms pinned to said base subassembly at their lower ends for pivotal movement about a first common axis, said catch bed assembly pinned to the upper ends of said arms for pivotal movement about a second common axis passing through the upper ends of said arms and generally parallel to and spaced from said first axis, said second axis moved with said arms along an arcuate path centered on said first axis; and selectively extendable tilt cylinder means pinned at one end to said base subassembly for pivotal movement about a third axis generally parallel to said first axis and spaced from said first axis by a first prescribed distance, and pinned at its other end to said catch bed assembly for pivotal movement about a fourth axis generally parallel to said second axis and spaced therefrom a second prescribed distance substantially equal to said first distance.

4. The tree transporting vehicle of Claim 3 wherein said positioning linkage further includes selectively extendable positioning cylinder means pinned to said base subassembly at one of its ends and to said pair of positioning arms at its other end to selectively pivot said arms about said first axis and said tilt cylinder means about said third axis.

5. A tree transporting vehicle comprising:
a base subassembly having a support frame and ground engaging means for moving said base subassembly;
a catch bed assembly for receiving the trees to be transported and supporting the trees therein above said base subassembly, said catch bed assembly including:
a carriage frame;
a slide rail assembly movably mounted on said carriage frame;
a catch bed movably carried by said slide rail assembly for movement relative to said slide rail assembly and said carriage frame, said catch bed defining a tree receiving chamber therein with open front and rear ends and an open top;
a heel plate assembly movably carried by said slide rail assembly and extending into said tree receiving chamber for movement relative to said carriage frame, said slide rail assembly and said bed; and,
tie means interconnecting said bed and said heel plate assembly so that said heel plate assembly is moved with said bed as said bed is moved forwardly in said carriage frame but said bed moves rearwardly in said carriage frame independently of said heel plate assembly; and,
a positioning linkage operatively connecting said catch bed assembly with said support frame, said positioning linkage movably positioning said catch bed assembly with respect to said base subassembly to receive the trees and to discharge the trees therefrom.

6. The tree transporting vehicle of claim 5 wherein said slide rail assembly includes a pair of spaced apart slide rails, each of said slide rails including an outside lower track, an inside lower track and an upper track; wherein said carriage frame includes a pair of spaced apart generally parallel side beams carried by said positioning linkage and a pair of spaced apart rail support rollers positioned on the inside of each of said side beams adapted to be received in said outside lower track of one of said slide rails so that said rail support rollers roll along said outside lower track to support said slide rails between said side beams; wherein said bed includes a first pair of spaced apart bed support rollers on one side thereof and a second pair of spaced apart bed support rollers on the opposite side thereof, said bed support rollers adapted to be received in said lower inside tracks of said slide rails so that said bed support rollers roll along said lower inside tracks as said bed moves with respect to said slide rail assembly; wherein said heel plate assembly includes a first pair of spaced apart heel support rollers on one side thereof and a second pair of heel support rollers on the opposite side thereof, said heel support rollers adapted to be received in said upper track so that said heel support rollers roll along said upper track as said heel plate assembly moves with respect to said slide rail assembly; and further including abuttment means for limiting the movement of said slide rail assembly with respect to said carriage frame, for limiting the movement of said bed with respect to said slide rail assembly, and for limiting the movement of said heel plate assembly with respect to said slide rail assembly and said bed.

7. The tree transporting vehicle of claim 1 wherein said interlock means includes a latch mechanism mounted on said heel plate assembly having a latch resiliently urged toward its extended position; a keeper carried by said carriage frame in a location to operatively engage said latch when said heel plate assembly is moved to a prescribed position, said keeper defining a rear facing camming surface constructed and arranged to force said latch upwardly over said keeper as said heel plate assembly approaches its forwardmost extended position and a forward facing locking face constructed and arranged to retain said latch forwardly thereof when said latch passes over said keeper and said latch is resiliently urged back to its extended position; and a release cam operatively engaging said latch forward of said keeper and urging said latch upwardly over said keeper to release said heel plate assembly from engagement by said keeper when said bed is moved to its rearmost retracted position.

8. The tree transporting vehicle of claim 1 further including an operator cab mounted on said subassembly for supporting the vehicle operator is a partially standing and partially sitting position.

9. The tree transporting vehicle of claim 8 wherein said operator cab defines an operator chamber therein and includes a vertically adjustable foot rest in said operator chamber on which the operator stands, a seat bottom in said operator chamber positioned to partially support the buttocks of the operator, and a seat back to support the back of the operator.

10. The tree transporting vehicle of claim 8 wherein said operator cab includes a cab frame defining an operator access opening therein, and a door selectively closing said opening, said door hinged at its top to said cab frame so that said opening is opened as the bottom of said door is pivoted upwardly and outwardly and said door frame including a catch mechanism mounted at the top of said opening to selectively engage the top edge of said door to hold said door open.

11. The tree transporting vehicle as set forth in claim 10 wherein said door is located on the front of said cab and defines a viewing opening therethrough, said door constructed and arranged to block the view of the operator in said cab when said door is open and to position said viewing opening in front of the operator when said door is closed for the operator to see therethrough.

12. The tree transporting vehicle as set forth in claim 11 further including a guard assembly covering said viewing opening on the outside of said door while allowing the operator to see therethrough, said guard assembly hinged to said door below said viewing opening; and a quick release mechanism releasably connecting said windshield assembly to said door at the top of said viewing opening, said quick release mechanism including a release manually engageable by the operator in said cab to cause said mechanism to release said guard assembly and allow it to pivot outwardly to clear said viewing opening for said operator to use said viewing opening as an emergency escape.

13. The tree transporting vehicle as set forth in claim 1 further including outrigger means for selectively engaging the ground in front of said base subassembly to increase the effective ground engaging area of said base subassembly.

14. The tree transporting vehicle of claim 1 wherein said positioning linkage includes:
   height positioning means for selectively varying the height of said catch bed assembly above said base subassembly from a raised position to a lowered position where said catch bed assembly is closer to said base subassembly in said lowered position than in said raised position, and
   tilt positioning means for selectively varying the tilt attitude of said catch bed assembly with respect to the horizontal, said height positioning means and said tilt positioning means operating independently of each other.

15. The tree transporting vehicle of claim 14 further including control means operatively interconnecting said height positioning means and said tilt positioning means, said control means disabling said height positioning means unless said catch bed assembly is in a predetermined tilt attitude with respect to the horizontal and disabling said tilt positioning means unless said catch bed assembly is in said lowered position.

16. A tree transporting vehicle comprising:
   a self-propelled base subassembly having a support frame with a longitudinal axis and a forward end and ground engaging means for supporting and moving said base subassembly;
   a carriage frame assembly having a longitudinal axis;
   a positioning linkage mounting said carriage frame assembly on said base subassembly, said positioning linkage selectively movably positioning said carriage frame assembly with respect to said base subassembly while maintaining the longitudinal axis of said carriage frame assembly generally vertically aligned with the longitudinal axis of said base subassembly to independently elevate and tilt said carriage frame with respect to said base subassembly;
   a catch bed having a front end and a rear end movably carried by said carriage frame assembly for selective movement of said catch bed forwardly and rearwardly with respect to said carriage frame generally along the longitudinal axis of said carriage frame assembly between an extended forward position and a retracted rear position, said catch bed defining a tree receiving chamber therein having an open front end;
   a heel plate assembly movably positioned with respect to said catch bed and said carriage frame for movement generally along the longitudinal axis of said carriage frame assembly between a first retracted position and a second extended position with respect to said carriage frame assembly, and between a third rear position and a fourth front position with respect to said catch bed, said heel plate assembly including a heel plate extending into said tree receiving chamber; and
   ejection means for moving said heel plate assembly from its first retracted position to its second extended position with respect to said carriage frame assembly while simultaneously moving said catch bed between its retracted rear position to its extended forward position, and for moving said catch bed from its extended forward position to its retracted rear position while maintaining said heel plate assembly in its second extended position with respect to said carriage frame and while moving said heel plate assembly with respect to said catch bed between its retracted rear position and its extended forward position.

17. A tree transporting vehicle of claim 16 wherein said heel plate assembly is freely movable with respect to said catch bed for movement generally along the longitudinal axis of said carriage frame assembly between its third position and its fourth front position with respect to said catch bed, and wherein said ejection means includes first latch means for selectively maintaining said heel plate assembly in its second extended position with respect to said carriage frame assembly, and release means for selectively releasing said first latch means when said catch bed approaches its retracted rear position to cause said second latch means to release said heel plate assembly for free movement of said heel plate assembly under the force of gravity from its second extended position with respect to said carriage frame assembly to its third rear position with respect to said catch bed.

18. The tree transporting vehicle of claim 17 wherein said ejection means further includes selectively extendable fluid cylinder means operatively connecting said catch bed with said carriage frame assembly for selectively moving said catch bed forwardly and rearwardly with respect to said carriage frame between its retracted rear position and its extended forward position.

19. The tree transporting vehicle of claim 18 wherein said ejection means further includes second latch means for releasably retaining said heel plate assembly in its rear third position with respect to said catch bed and in its first retracted position with respect to said carriage frame assembly when said catch bed is in its retracted rear position.

20. The tree transporting vehicle of claim 16 wherein said positioning linkage includes height positioning means for selectively varying the height of said carriage frame assembly above said base subassembly from a raised position to a lower position where said carriage frame assembly is closer to said base subassembly in said lowered position than in said raised position, and tilt positioning means for selectively varying the tilt attitude of said carriage frame assembly with respect to the horizontal, said vehicle further including outrigger means selectively movable between an extended position engaging the ground in front of said base subassembly to increase the effective ground engaging area of said base subassembly and a raised position out of engagement with the ground in front of said base subassembly; and, control means operatively interconnecting said height positioning means, said tilt positioning means and said outrigger means for selectively disabling said height positioning means unless said carriage frame assembly is in a predetermined tilt attitude with respect to the horizontal, for selectively disabling said tilt positioning means unless said carriage frame assembly is in said lowered position, and for further disabling said height positioning means unless said outrigger means is in its extended position engaging the ground in front of said base subassembly.

* * * * *